US012671668B2

(12) United States Patent (10) Patent No.: US 12,671,668 B2
Zhang et al. (45) Date of Patent: Jun. 30, 2026

(54) METHOD AND APPARATUS FOR LOCAL APPLICATION SERVER DISCOVERY IN MOBILE EDGE COMPUTING

(71) Applicant: Telefonaktiebolaget LM Ericsson (publ), Stockholm (SE)

(72) Inventors: Kefeng Zhang, Beijing (CN); Jinyin Zhu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 107 days.

(21) Appl. No.: 18/636,283

(22) Filed: Apr. 16, 2024

(65) Prior Publication Data

US 2024/0259341 A1 Aug. 1, 2024

Related U.S. Application Data

(63) Continuation of application No. 17/753,974, filed as application No. PCT/CN2020/109537 on Aug. 17, 2020, now Pat. No. 11,979,367.

(30) Foreign Application Priority Data

Sep. 18, 2019 (WO) ................ PCT/CN2019/106486

(51) Int. Cl.
*H04L 61/4511* (2022.01)
(52) U.S. Cl.
CPC ................................ *H04L 61/4511* (2022.05)
(58) Field of Classification Search
CPC . H04L 61/4511; H04L 67/51; H04L 61/5014; H04L 67/289; H04W 8/02
See application file for complete search history.

(56) References Cited

U.S. PATENT DOCUMENTS 9,848,399 B2 * 12/2017 Roeland ................ H04W 60/00
12,056,485 B2 * 8/2024 Malladi ................ H04L 67/561
(Continued)

FOREIGN PATENT DOCUMENTS

CN 109788078 A 5/2019
CN 110198516 A 9/2019
(Continued)

OTHER PUBLICATIONS https://www.etsi.org/deliver/etsi_gs/MEC/001_099/003/02.01.01_60/gs_MEC003v020101p.pdf Jan. 2019.*
(Continued)

*Primary Examiner* — Jimmy H Tran
(74) *Attorney, Agent, or Firm* — Nicholson De Vos Webster & Elliott LLP

(57) ABSTRACT

A method and apparatus for local application server discovery in edge computing. A method at a network node comprises determining whether one or more domain name system (DNS) servers in an edge computing of a network are available for a user equipment (UE) based on at least one of local configuration information, the UE's current location, the UE's capability or the UE's user subscription. The edge computing is close to the UE. The method further comprises in response to a positive determination, sending, to the UE, a first message including respective address of the one or more DNS servers in the edge computing of the network.

25 Claims, 11 Drawing Sheets

(56) References Cited

U.S. PATENT DOCUMENTS

| | | | | |
|---|---|---|---|---|
| 2012/0147834 A1* | 6/2012 | Zisimopoulos | ......... | H04W 8/12 |
| | | | | 370/328 |
| 2013/0191499 A1* | 7/2013 | Ludin | ..................... | H04L 67/02 |
| | | | | 709/217 |
| 2014/0153489 A1* | 6/2014 | Perras | .................. | H04W 60/00 |
| | | | | 370/328 |
| 2014/0192780 A1* | 7/2014 | Kim | ..................... | H04W 48/08 |
| | | | | 370/331 |
| 2014/0241153 A1* | 8/2014 | Chowdhury | ............ | H04L 45/04 |
| | | | | 370/230 |
| 2014/0341109 A1* | 11/2014 | Cartmell | ................ | H04L 43/50 |
| | | | | 370/328 |
| 2015/0046591 A1* | 2/2015 | Zhu | ......................... | H04L 47/70 |
| | | | | 709/226 |
| 2015/0124622 A1 | 5/2015 | Kovvali et al. | | |
| 2017/0126618 A1* | 5/2017 | Bhaskaran | .......... | H04L 61/5014 |
| 2018/0198672 A1* | 7/2018 | Zuniga | ................... | H04W 8/06 |
| 2018/0317157 A1 | 11/2018 | Baek et al. | | |
| 2018/0324138 A1* | 11/2018 | Das | ..................... | H04L 61/5053 |
| 2019/0274185 A1* | 9/2019 | Stojanovski | ........ | H04L 47/2441 |
| 2019/0387458 A1* | 12/2019 | Li | ......................... | H04W 48/14 |
| 2020/0112848 A1* | 4/2020 | Palaniappan | ......... | H04W 76/16 |
| 2020/0137021 A1* | 4/2020 | Janakiraman | ....... | H04L 63/0281 |
| 2020/0137024 A1* | 4/2020 | Janakiraman | ....... | H04L 63/0236 |
| 2020/0137093 A1* | 4/2020 | Janakiraman | ....... | H04L 63/0263 |
| 2020/0137094 A1* | 4/2020 | Janakiraman | .......... | G06N 20/00 |
| 2020/0137115 A1* | 4/2020 | Janakiraman | ........ | H04L 43/028 |
| 2020/0260370 A1* | 8/2020 | Nithiyanantham | ... | H04W 36/12 |
| 2020/0280822 A1* | 9/2020 | Stammers | ........... | H04L 67/1021 |
| 2020/0314694 A1* | 10/2020 | Yu | ........................... | H04L 49/70 |
| 2020/0374762 A1* | 11/2020 | Ghadge | ................ | H04W 48/18 |
| 2020/0404069 A1* | 12/2020 | Li | ............................ | H04L 67/59 |
| 2021/0007166 A1* | 1/2021 | Liao | ..................... | H04W 48/16 |
| 2021/0092675 A1* | 3/2021 | Buckley | ............... | H04B 1/3816 |
| 2021/0212134 A1* | 7/2021 | Sternberg | .............. | H04W 72/51 |
| 2021/0235542 A1* | 7/2021 | Li | ...................... | H04L 12/1407 |
| 2021/0281537 A1* | 9/2021 | Zhang | ................. | H04L 67/1001 |
| 2021/0307018 A1* | 9/2021 | Qaisrani | .............. | H04W 48/16 |
| 2021/0320896 A1* | 10/2021 | Feng | ................... | H04L 61/5007 |
| 2021/0320897 A1* | 10/2021 | Stojanovski | ............ | H04W 4/50 |
| 2021/0326128 A1* | 10/2021 | Malladi | ............ | H04L 12/40006 |
| 2021/0345108 A1* | 11/2021 | Li | ......................... | H04W 60/04 |
| 2022/0030084 A1* | 1/2022 | Starsinic | .............. | H04L 67/568 |
| 2022/0038554 A1* | 2/2022 | Merwaday | .............. | H04L 45/64 |
| 2022/0053332 A1* | 2/2022 | Venkatachalam | ... | H04L 63/0272 |
| 2022/0086218 A1* | 3/2022 | Sabella | ................. | H04M 15/66 |
| 2022/0124065 A1* | 4/2022 | Dao | ................... | H04L 61/5007 |
| 2022/0174032 A1* | 6/2022 | Zhu | ..................... | H04L 45/121 |
| 2022/0191090 A1* | 6/2022 | Lee | ......................... | H04L 67/04 |
| 2022/0191100 A1* | 6/2022 | Kim | ................... | H04L 41/0853 |
| 2022/0191292 A1* | 6/2022 | Skubic | ................... | H04L 67/52 |
| 2022/0191776 A1* | 6/2022 | Kim | ........................ | H04L 67/51 |
| 2022/0263788 A1* | 8/2022 | Lee | ................... | H04L 61/4511 |
| 2022/0278955 A1* | 9/2022 | Roy | ................... | H04L 67/1021 |
| 2022/0345442 A1* | 10/2022 | Lee | ......................... | H04L 67/10 |
| 2022/0386097 A1* | 12/2022 | Buckley | ................ | H04W 12/06 |
| 2022/0394088 A1* | 12/2022 | Salkintzis | .............. | H04L 67/56 |
| 2023/0013720 A1* | 1/2023 | Gupta | .................. | H04W 76/19 |
| 2023/0026671 A1* | 1/2023 | Seed | ................ | H04W 36/0033 |
| 2023/0156094 A1* | 5/2023 | Hergenhan | .......... | H04L 67/1004 |
| | | | | 709/227 |
| 2023/0239215 A1* | 7/2023 | Kim | ........................ | H04L 67/51 |
| | | | | 709/223 |
| 2023/0300726 A1* | 9/2023 | Zhang | .................. | H04L 67/141 |
| | | | | 709/203 |
| 2023/0308951 A1* | 9/2023 | Zhang | ................. | H04W 28/084 |
| 2023/0362129 A1* | 11/2023 | Hall | ........................ | H04L 61/58 |
| 2024/0022540 A1* | 1/2024 | Ke | ..................... | H04L 61/4511 |
| 2024/0073798 A1* | 2/2024 | Kim | ....................... | H04W 8/20 |
| 2024/0259857 A1* | 8/2024 | Zhu | ....................... | H04W 76/11 |
| 2024/0370251 A1* | 11/2024 | Malladi | ................... | H04L 67/12 |

FOREIGN PATENT DOCUMENTS

| | | | |
|---|---|---|---|
| JP | 2013-239884 A | 11/2013 | |
| WO | 2008/131681 A1 | 11/2008 | |
| WO | 2017/094246 A1 | 6/2017 | |
| WO | 2018/171859 A1 | 9/2018 | |
| WO | 2018/199649 A1 | 11/2018 | |

OTHER PUBLICATIONS

Hoglund, Andreas, et al. "3GPP release 15 early data transmission." IEEE Communications Standards Magazine 2.2 (2018): 90-96.*

3GPP TS 23.401 V16.3.0, "3rd Generation Partnership Project; Technical Specification Group Services and System Aspects; General Packet Radio Service (GPRS) enhancements for Evolved Universal Terrestrial Radio Access Network (E-UTRAN) access (Release 16)," Jun. 2019, 423 pages, 3GPP Organizational Partners.

3GPP TS 23.501 V16.1.0, "3rd Generation Partnership Project; Technical Specification Group Services and System Aspects; System Architecture for the 5G System; Stage 2 (Release 16)," Jun. 2019, 368 pages, 3GPP Organizational Partners.

3GPP TS 23.502 V16.1.1, "3rd Generation Partnership Project; Technical Specification Group Services and System Aspects; Procedures for the 5G System; Stage 2 (Release 16)," Jun. 2019, 495 pages, 3GPP Organizational Partners.

Cisco et al., "PGW based provisioning of the DNS server address for the S2b interface", Feb. 6-10, 2012, 5 pages, 3GPP TSG CT WG4 Meeting #56, C4-120362, Xiamen, People's Republic of China.

D. Binet et al., "An IPv6 Profile for 3GPP Mobile Devices", May 2016, pp. 1-22, Independent Submission, Request for Comments: 7849.

Examination Report, IN App. No. 202247021572, Aug. 18, 2022, 6 pages.

Final Office Action, U.S. Appl. No. 17/753,974, Jun. 16, 2023, 12 pages.

Huawei et al., "Pseudo-CR on Edge Application Server Discovery based on DNS", Sep. 2-6, 2019, 3 pages, 3GPP TSG-SA WG6 Meeting #33, S6-191886, Sophia Antipolis, France.

International Preliminary Report on Patentability, PCT App. No. PCT/CN2020/109537, Mar. 31, 2022, 5 pages.

International Search Report and Written Opinion for Application No. PCT/CN2020/109537, dated Nov. 20, 2020, 9 pages.

Non-Final Office Action, U.S. Appl. No. 17/753,974, Feb. 16, 2023, 11 pages.

Notice of Allowance, U.S. Appl. No. 17/753,974, Dec. 22, 2023, 10 pages.

Office Action, CN App. No. 202080065481.8, Apr. 22, 2023, 7 pages (1 pages of English Translation and 6 pages of Original Document).

Office Action, JP App. No. 2022-517157, Jun. 13, 2023, 5 pages (2 pages of English Translation and 3 pages of Original Document).

P. Mockapetris, "Domain Names—Concepts and Facilities," Nov. 1987, 55 pages, Network Working Group, Request for Comments: 1034.

P. Mockapetris, "Domain Names—Implementation and Specification," Nov. 1987, 55 pages, Network Norking Group, Request for Comments: 1035.

R. Droms, "Dynamic Host Configuration Protocol," Mar. 1997, 45 pages, Network Working Group, Request for Comments: 2131.

R. Droms, "Stateless Dynamic Host Configuration Protocol {DHCP) Service for 1Pv6," Apr. 2004, 9 pages, Network Norking Group, Request for Comments: 3736, The Internet Society.

Samsung, "Discussion on Edge Application Discovery," Jul. 8-12, 2019, 3 pages, 3GPP TSG-SA WG6 Meeting #32, S6-191354, Roma, Italia.

Samsung, "Solution for key issue #1: EAS discovery," Nov. 11-15, 2019, 9 pages, 3GPP TSG-SA WG6 Meeting #34, S2-1911602, Reno, Nevada.

Soohong Park et al., "DNS Configuration in IPv6: Approaches, Analysis, and Deployment Scenarios", Feature: Next-Generation Internet, 2013, pp. 48-56, vol. 17, No. 4, IEEE Internet Computing.

(56)           References Cited

OTHER PUBLICATIONS

Supplementary European Search Report and Search Opinion, EP
App. No. 20864486.4, Jul. 27, 2023, 11 pages.

* cited by examiner

Figure 3:
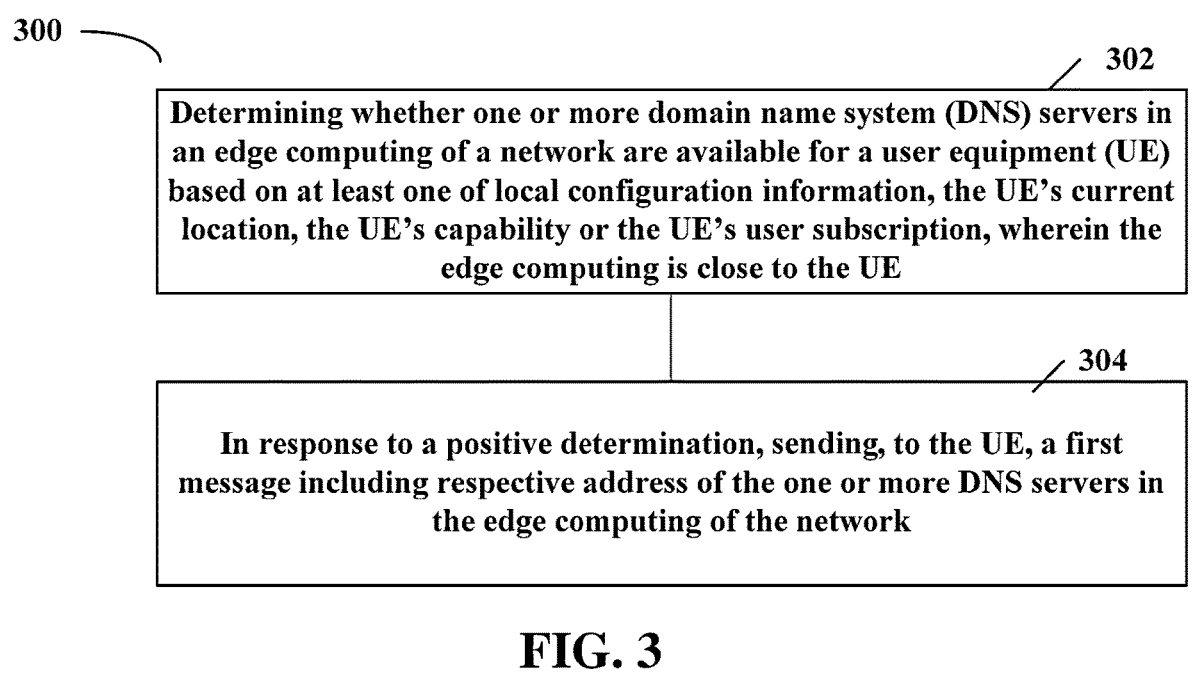

300

302

Determining whether one or more domain name system (DNS) servers in an edge computing of a network are available for a user equipment (UE) based on at least one of local configuration information, the UE's current location, the UE's capability or the UE's user subscription, wherein the edge computing is close to the UE

304

In response to a positive determination, sending, to the UE, a first message including respective address of the one or more DNS servers in the edge computing of the network

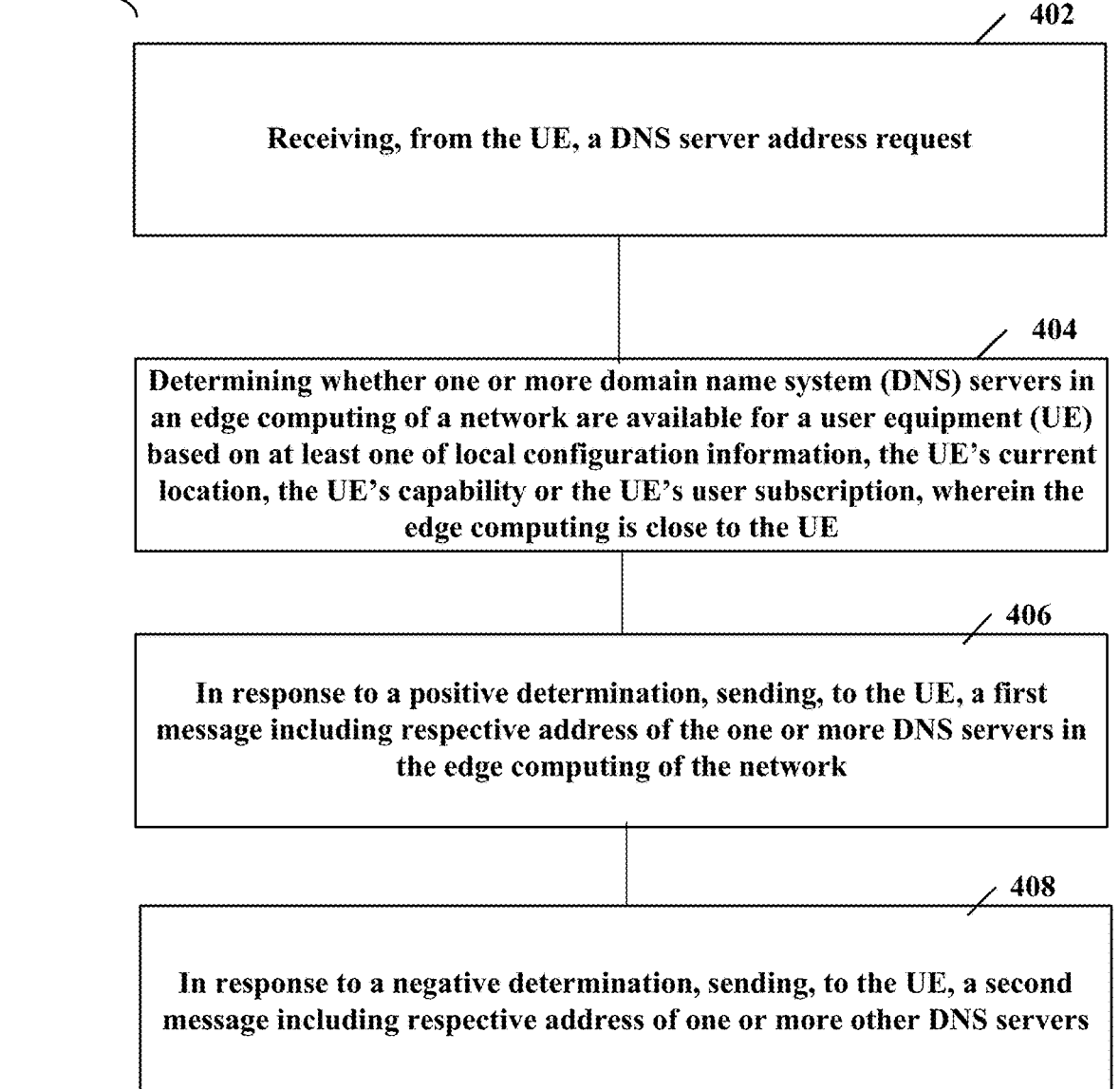

402

Receiving, from the UE, a DNS server address request

404

Determining whether one or more domain name system (DNS) servers in an edge computing of a network are available for a user equipment (UE) based on at least one of local configuration information, the UE's current location, the UE's capability or the UE's user subscription, wherein the edge computing is close to the UE

406

In response to a positive determination, sending, to the UE, a first message including respective address of the one or more DNS servers in the edge computing of the network

408

In response to a negative determination, sending, to the UE, a second message including respective address of one or more other DNS servers

Figures 5, 6:
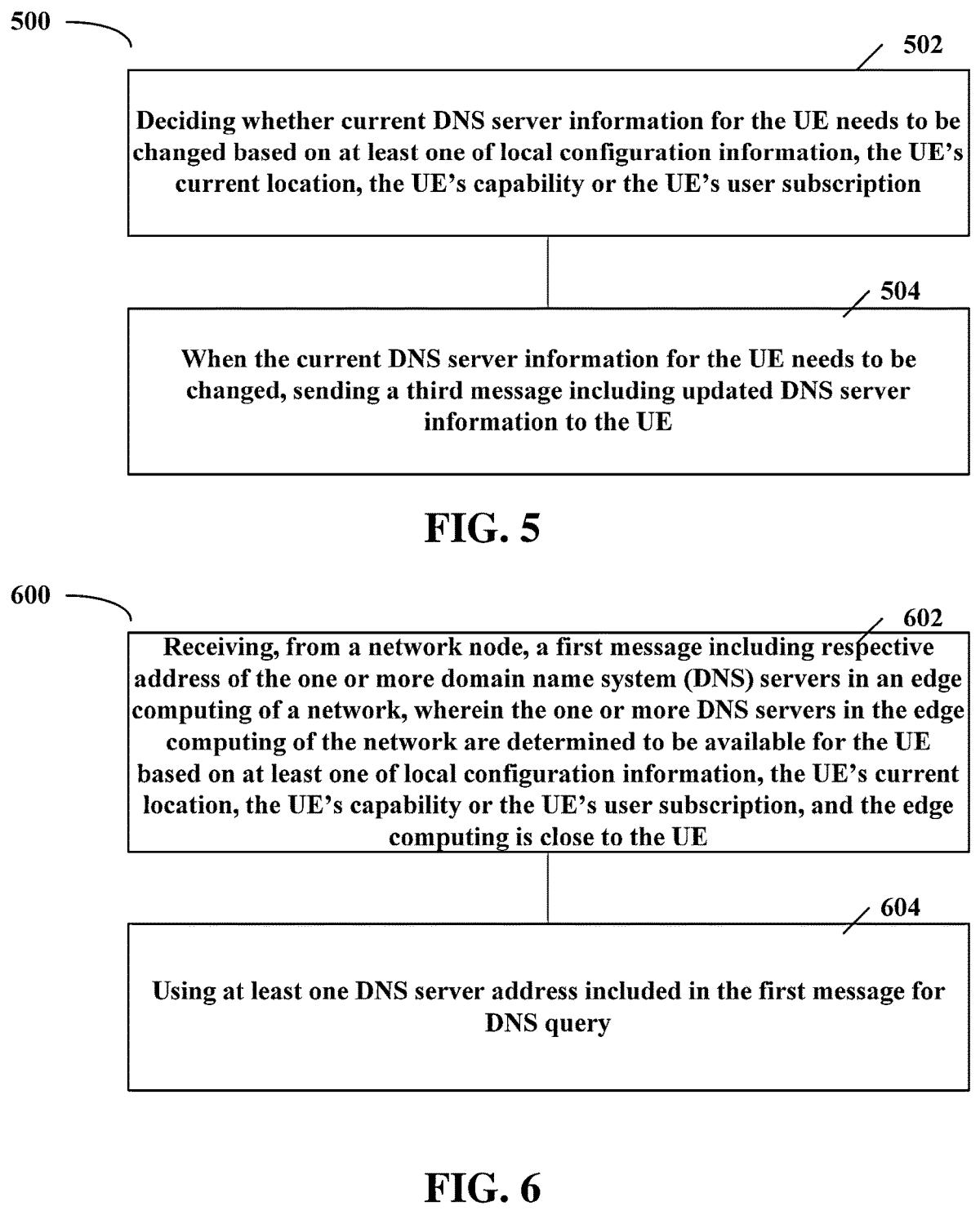

Deciding whether current DNS server information for the UE needs to be changed based on at least one of local configuration information, the UE's current location, the UE's capability or the UE's user subscription

504

When the current DNS server information for the UE needs to be changed, sending a third message including updated DNS server information to the UE

Receiving, from a network node, a first message including respective address of the one or more domain name system (DNS) servers in an edge computing of a network, wherein the one or more DNS servers in the edge computing of the network are determined to be available for the UE based on at least one of local configuration information, the UE's current location, the UE's capability or the UE's user subscription, and the edge computing is close to the UE

604

Using at least one DNS server address included in the first message for DNS query

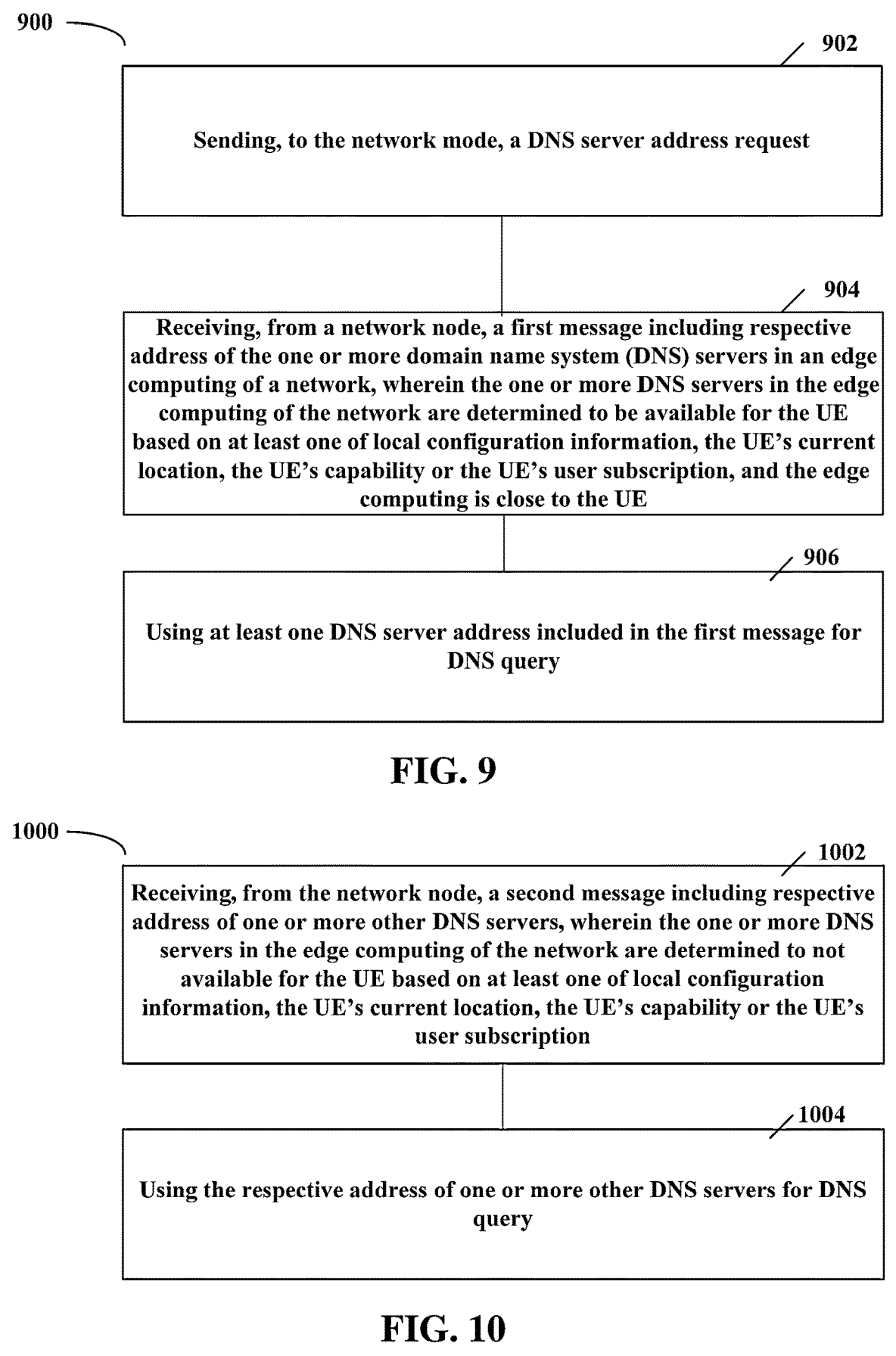

Sending, to the network mode, a DNS server address request

/ 904

Receiving, from a network node, a first message including respective address of the one or more domain name system (DNS) servers in an edge computing of a network, wherein the one or more DNS servers in the edge computing of the network are determined to be available for the UE based on at least one of local configuration information, the UE's current location, the UE's capability or the UE's user subscription, and the edge computing is close to the UE

/ 906

Using at least one DNS server address included in the first message for DNS query

Receiving, from the network node, a second message including respective address of one or more other DNS servers, wherein the one or more DNS servers in the edge computing of the network are determined to not available for the UE based on at least one of local configuration information, the UE's current location, the UE's capability or the UE's user subscription

/ 1004

Using the respective address of one or more other DNS servers for DNS query

FIG. 10

METHOD AND APPARATUS FOR LOCAL APPLICATION SERVER DISCOVERY IN MOBILE EDGE COMPUTING

CROSS-REFERENCE TO RELATED APPLICATIONS

This application is a continuation of U.S. application Ser. No. 17/753,974, filed Mar. 18, 2022, which is the National stage of International Application No. PCT/CN2020/ 109537, filed Aug. 17, 2020, which claims priority to International Application No. PCT/CN2019/106486, filed Sep. 18, 2019, which are hereby incorporated by reference.

TECHNICAL FIELD

The non-limiting and exemplary embodiments of the present disclosure generally relate to the technical field of communications, and specifically to methods and apparatuses for local application server discovery in edge computing.

BACKGROUND

This section introduces aspects that may facilitate a better understanding of the disclosure. Accordingly, the statements of this section are to be read in this light and are not to be understood as admissions about what is in the prior art or what is not in the prior art.

The DNS is a distributed directory that resolves human-readable hostnames or domain names into machine-readable addresses such as IP addresses. In generally, the DNS server address of a user equipment (UE) may be configured manually or via a network device such as a packet data network (PDN) gateway (PGW) or a session management function (SMF) or a User Plane Function (UPF) or a dynamic host configuration protocol (DHCP) server, etc. When the DNS server address of the UE is configured manually, the user may configure it for example based on the user's preference. When the DNS server address of the UE is configured or discovered via the network device, all the UEs configured by the network device may get the same DNS configuration information.

Some networks/systems such as the fifth generation (5G) system can support a deployment of many applications and/or contents towards an edge (such as edge computing) of the network in a distributed manner to provide low latency and huge data volume with high efficiency. Edge computing such as mobile edge computing (MEC) may be considered as one key enabler to fulfill this kind of deployment. With the edge computing, the operators of the networks are able to host their own and/or the third party applications and/or contents close to the user. The UE can access the application and/or content deployed in the edge computing close to the user for example via (radio) access network ((R)AN) and locally deployed user plane function (UPF), thus fulfilling the expectations on the end to end user experience, and allowing the low latency to the edge applications and the heavy traffic to be offloaded from backbone network to the edge of the network.

5G system is able to support selective traffic routing to a data network (DN). For example, some selected traffic may be forwarded on an N6 interface to the DN via a local UPF that may be "close" to the access network (AN) serving the UE, other traffic may be routed to the DN via a "central" UPF that may be deployed in a center of the network. The session management function (SMF) may control the data path of a packet data unit (PDU) session so that the PDU session may simultaneously correspond to multiple N6 interfaces.

In 5G system (5GS), to support the edge computing and its deployment, some enablers have been specified in 3rd Generation Partnership Project (3GPP), for example, local area data network (LADN), local access to a DN by locally deployed UPF (supporting uplink classifier (UL CL) or branching point (BP)), user plane (re)selection, and AF (application function) influenced traffic routing.

Several solutions have been proposed for discussion in 3GPP but no agreement can be reached, for example, redirecting DNS query request to a local DNS server in the edge of the network, modifying information (e.g. server address) in the DNS response, or modifying a destination IP address of user traffic flow.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some issues that were raised during the initial 5GS work (e.g. Internet protocol (IP) discovery for local application server for example deployed in the MEC, support for seamless application migration, etc.), but not fully addressed in current specification of 3GPP.

Before an introduction of the MEC service, a serving DNS server can discovery a static and unique application server for a user of a UE, regardless of mobility of the UE. The DNS resolution process may only need to be queried from pre-registered information. However, when the MEC service is introduced, the application servers can be deployed at the edge of the network. There may be multiple instances of application server corresponding to different IP addresses. Furthermore, for 5G MEC-based Content Distribution Networks (CDNs), the selection of application servers subjects to change for example due to UE mobility from a serving area of a MEC to another serving area of another MEC. The discovery of application server becomes too complicated to be resolved by a current DNS discovery mechanism.

As described in the above, some solutions have been discussed in 3GPP, however these solutions violate a principle of request for comments (RFC) standards for DNS and potentially open users to cross-site scripting attacks.

To overcome or mitigate at least one above mentioned problems or other problems or provide a useful solution, local application server discovery in edge computing may be desirable.

In an embodiment, SMF can send an address of local DNS Server (LDNS) in a MEC platform to a UE if MEC is available for the UE's location. The UE may update its IP configuration with the received address of LDNS. The UE can map different applications to different DNS servers (Remote DNS server or local DNS server). In this way of dynamic DNS address configuration, the UE can query and discover the IP address of the local application servers (AS) in the edge of the network.

In an embodiment, the SMF may only send the UE the address of LDNS. The UE can replace the address of its old DNS server with the address of LDNS, which means that all DNS queries in the PDU session will be sent to the LDNS. In this case, LDNS can support the capability of DNS recursive or forwarding DNS queries to central DNS server, when the requested application server is not available in the MEC platform.

In an embodiment, the SMF can send the addresses of multiple DNS servers (e.g. LDNS as primary and central DNS server as backup) to the UE.

In a first aspect of the disclosure, there is provided a method at a network node. The method comprises determining whether one or more domain name system (DNS) servers in an edge computing of a network are available for a user equipment (UE) based on at least one of local configuration information, the UE's current location, the UE's capability or the UE's user subscription. The edge computing is close to the UE. The method further comprises in response to a positive determination, sending, to the UE, a first message including respective address of the one or more DNS servers in the edge computing of the network.

In an embodiment, the step of determining may be in response to a configuration update initiated by the network.

In an embodiment, the method may further comprise receiving, from the UE, a DNS server address request. The step of determining may be in response to receiving the DNS server address request.

In an embodiment, the DNS server address request may indicate that the UE requests the one or more DNS servers in the edge computing of the network.

In an embodiment, the DNS server address request may be an Internet protocol (IP) version 4 and/or version 6 DNS server address request.

In an embodiment, the DNS server address request and the respective address of the one or more DNS servers may be included in extended protocol configuration options (PCO) during a packet data network (PDN) connection establishment procedure or a protocol data unit (PDU) session establishment procedure.

In an embodiment, the DNS server address request may be included in a dynamic host configuration protocol (DHCP) discovery message.

In an embodiment, the first message may include only the respective address of one or more DNS servers in the edge computing of the network.

In an embodiment, the first message may include the respective address of one or more DNS servers in the edge computing of the network and respective address of one or more other DNS servers.

In an embodiment, the respective address of one or more DNS servers in the edge computing of the network included in the first message may have an indication that the one or more DNS servers are in the edge computing of network.

In an embodiment, the method may further comprise in response to a negative determination, sending, to the UE, a second message including respective address of one or more other DNS servers.

In an embodiment, the DNS server addresses included in the first message may be listed in order of preference such that the one or more DNS servers in the edge computing of the network are selected for DNS query by the UE at first.

In an embodiment, a rule of DNS address selection may be delivered to the UE such that the one or more DNS servers in the edge computing of the network are selected for DNS query by the UE at first.

In an embodiment, the first message may be a protocol data unit (PDU) session establishment accept message or an activate default EPS bearer context request.

In an embodiment, the method may further comprise deciding whether current DNS server information for the UE needs to be changed based on at least one of local configuration information, the UE's current location, the UE's capability or the UE's user subscription. The method may further comprise when the current DNS server information for the UE needs to be changed, sending a third message including updated DNS server information to the UE.

In an embodiment, the updated DNS server information may include respective address of one or more DNS servers in another edge computing of the network. Said another edge computing may be close to the UE.

In an embodiment, the updated DNS server information may be included in extended protocol configuration options (PCO) during a protocol data unit (PDU) session modification procedure or a packet data network gateway (PGW) initiated bearer modification procedure.

In an embodiment, the third message may be a protocol data unit (PDU) session modification command message or modify evolved packet system (EPS) bearer context request.

In an embodiment, at least one application and/or content may be deployed towards the edge computing of the network in a distributed manner.

In an embodiment, the network node may be a packet data network (PDN) gateway or session management function (SMF).

In a second aspect of the disclosure, there is provided a method at a user equipment (UE). The method comprises receiving, from a network node, a first message including respective address of the one or more domain name system (DNS) servers in an edge computing of a network. The one or more DNS servers in the edge computing of the network are determined to be available for the UE based on at least one of local configuration information, the UE's current location, the UE's capability or the UE's user subscription, and the edge computing is close to the UE. The method further comprises using at least one DNS server address included in the first message for DNS query.

In an embodiment, the step of receiving may be in response to a configuration update initiated by the network.

In an embodiment, the method may further comprise sending, to the network mode, a DNS server address request. The step of receiving may be in response to sending the DNS server address request.

In an embodiment, the method may further comprise receiving, from the network node, a second message including respective address of one or more other DNS servers. The one or more DNS servers in the edge computing of the network are determined to not available for the UE based on at least one of local configuration information, the UE's current location, the UE's capability or the UE's user subscription. the method may further comprise using the respective address of one or more other DNS servers for DNS query.

In an embodiment, the method may further comprise receiving a third message including updated DNS server information from the network node. The method may further comprise using the updated DNS server information for DNS query.

In a third aspect of the disclosure, there is provided an apparatus at network node. The apparatus comprises a processor; and a memory coupled to the processor, said memory containing instructions executable by said processor, whereby said apparatus is operative to determine whether one or more domain name system (DNS) servers in an edge computing of a network are available for a user equipment (UE) based on at least one of local configuration information, the UE's current location, the UE's capability or the UE's user subscription. The edge computing is close to the UE. Said apparatus is further operative to in response to a positive determination, send, to the UE, a first message including respective address of the one or more DNS servers in the edge computing of the network.

In a fourth aspect of the disclosure, there is provided an apparatus at a user equipment (UE). The apparatus comprises a processor; and a memory coupled to the processor, said memory containing instructions executable by said processor, whereby said apparatus is operative to receive, from a network node, a first message including respective address of the one or more domain name system (DNS) servers in an edge computing of a network, wherein the one or more DNS servers in the edge computing of the network are determined to be available for the UE based on at least one of local configuration information, the UE's current location, the UE's capability or the UE's user subscription, and the edge computing is close to the UE. Said apparatus is further operative to use at least one DNS server address included in the first message for DNS query.

In a fifth aspect of the disclosure, there is provided a network node. The network node comprises a determining module and an sending module. The determining module may be configured to determine whether one or more domain name system (DNS) servers in an edge computing of a network are available for a user equipment (UE) based on at least one of local configuration information, the UE's current location, the UE's capability or the UE's user subscription, wherein the edge computing is close to the UE. The sending module may be configured to send, to the UE, a first message including respective address of the one or more DNS servers in the edge computing of the network in response to a positive determination.

In a sixth aspect of the disclosure, there is provided a UE. The UE comprises a receiving module and a using module. The receiving module may be configured to receive, from a network node, a first message including respective address of the one or more domain name system (DNS) servers in an edge computing of a network. The one or more DNS servers in the edge computing of the network are determined to be available for the UE based on at least one of local configuration information, the UE's current location, the UE's capability or the UE's user subscription, and the edge computing is close to the UE. The using module may be configured to use at least one DNS server address included in the first message for DNS query.

In another aspect of the disclosure, there is provided a computer program product comprising instructions which, when executed on at least one processor, cause the at least one processor to carry out the method according to the first aspect of the disclosure.

In another aspect of the disclosure, there is provided a computer program product comprising instructions which, when executed on at least one processor, cause the at least one processor to carry out the method according to the second aspect of the disclosure.

In another aspect of the disclosure, there is provided a computer-readable storage medium storing instructions which, when executed on at least one processor, cause the at least one processor to carry out the method according to the first aspect of the disclosure.

In another aspect of the disclosure, there is provided a computer-readable storage medium storing instructions which, when executed on at least one processor, cause the at least one processor to carry out the method according to the second aspect of the disclosure.

Many advantages may be achieved by applying the proposed solution according to embodiments of the present disclosure. For example, some embodiments of the disclosure may provide a method of successful discovery of application server address that is "close" to the UE via a method of dynamic configuration of DNS address in the UE. Some embodiments of the disclosure may can resolve the problem of MEC traffic routing in the 5G system. Some embodiments of the disclosure may maintain the consistence of standardized DNS discovery procedures and the integrity of user DNS messages. Some embodiments of the disclosure can avoid the security risk of DNS hijacking and IP packet modification. In some embodiments of the disclosure, more security extension (for example: HTTPS (Hypertext Transfer Protocol Secure), DNSSEC (Domain Name System Security Extensions) etc.) can be supported in the solution. Some embodiments of the disclosure can be based on standardized 5G signaling procedures (e.g. PDU Session establishment, PDU Session Modification etc.) with the enhancement of dynamic DNS address configuration in the UE. Some embodiments of the disclosure can be realized via simple modification to the information elements of related NAS messages. Some embodiments of the disclosure can minimize the impact to the 5G system, no modification requirement to the User Plane Function (UPF). Some embodiments of the disclosure can resolve the problem of IP address discovery of application servers in the MEC via a method of dynamic configuration of DNS address in the UE. In some embodiments of the disclosure, the SMF can update the IP configuration in the UE, e.g. address of Local DNS (LDNS), when the new PSA UPF connecting to the MEC was established. Some embodiments of the disclosure propose single DNS address in the UE. Some embodiments of the disclosure propose multiple DNS addresses in the UE. In some embodiments of the disclosure, the UE can easily discover the local AS via the LDNS server in the MEC, and selected traffic may be forwarded to the AS that is "close" to the UE.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 3 shows a flowchart of a method according to an embodiment of the present disclosure;

FIG. 4 shows a flowchart of a method according to another embodiment of the present disclosure;

FIG. 5 shows a flowchart of a method according to another embodiment of the present disclosure;

FIG. 6 shows a flowchart of a method according to another embodiment of the present disclosure;

FIG. 9 shows a flowchart of a method according to an embodiment of the present disclosure;

FIG. 10 shows a flowchart of a method according to another embodiment of the present disclosure;

DETAILED DESCRIPTION

Figure 1:
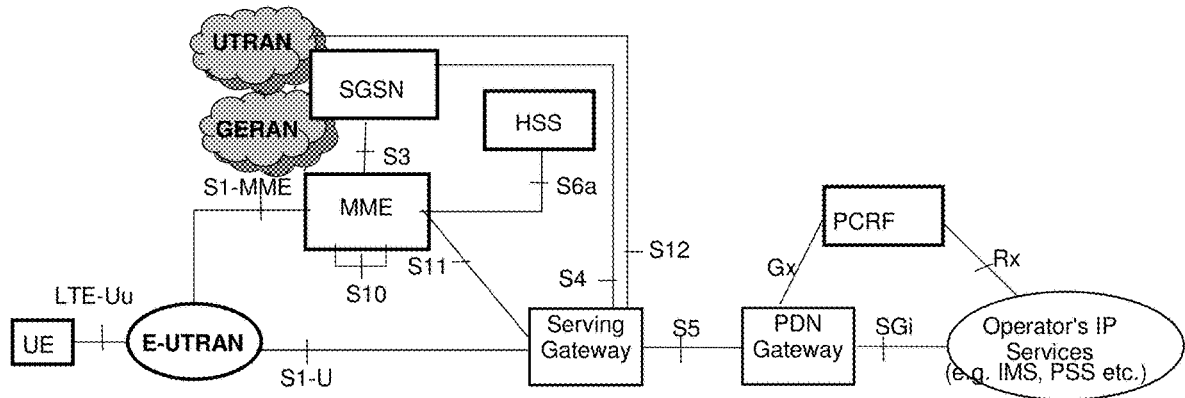
FIG. 1 schematically shows a high level architecture in a 4G network.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols as may comprise the first generation (1G), 2G, 3G, 4G, 4.5G, 5G communication protocols, and/or any other protocols either currently known or to be developed in the future.

The term "network entity" or "network node" as used herein refers to a network device (physical or virtual) in a communication network. In CUPS (Control User Plane Split) architecture, the network node may comprise a control plane function and a user plane function. The network device may offer numerous services to customers who are interconnected by an access network device. Each access network device is connectable to a core network device over a wired or wireless connection.

The term "network function (NF)" refers to any suitable function which can be implemented in a network node (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (NF Repository Function), (R)AN ((radio) access network), SCP (service communication proxy), etc. In other embodiments, the network function may comprise different types of NFs for example depending on a specific type of network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VOIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system using any suitable components, the embodiments disclosed herein are described in relation to a communication system complied with the exemplary system architecture as illustrated in clause 4.2 of 3GPP TS23.501 V16.1.0 and clause 4.2 of 3GPP TS 23.401 V16.3.0, the disclosure of which is incorporated by reference herein in its entirety. For simplicity, the system architectures of FIGS. 1-2 only depict some exemplary elements of exemplary system architectures. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1 schematically shows a high level architecture in a 4G network. The functional description of the entities and the description of reference points as shown in FIG. 1 are specified in 3GPP TS 23.401 V16.3.0. FIG. 1 only depicts some exemplary elements such as universal terrestrial radio access network (UTRAN), Global System for Mobile Communications (GSM)/Enhanced Data for GSM Evolution (EDGE) Radio Access Network (GERAN), serving general packet radio service support node (SGSN), mobility management entity (MME), Policy and Charging Rules Function (PCRF), home subscriber server (HSS), UE, evolved universal terrestrial radio access network (E-UTRAN), Serving gateway (SGW), PDN gateway (PGW), etc. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

The PGW is the gateway which terminates the SGi interface towards the PDN. The PGW functions may include for both the GTP-based and the PMIP-based S5/S8:

UE IP address allocation;

DHCPv4 (server and client) and DHCPv6 (client and server) functions;

etc.

Figure 2:
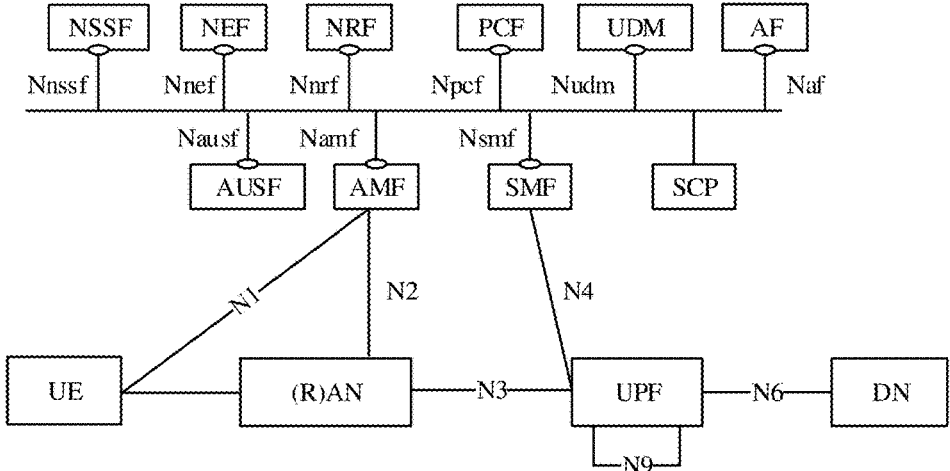
FIG. 2 schematically shows a high level architecture in a 5G network.

FIG. 2 schematically shows a high level architecture in a 5G network. The system architecture of FIG. 2 may comprise some exemplary elements such as AUSF, AMF, DN, NEF, NRF, NSSF, PCF, SMF, UDM, UPF, SCP, AF, UE, (R)AN.

In accordance with an exemplary embodiment, the UE can establish a signaling connection with the AMF over the reference point N1, as illustrated in FIG. 2. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a packet data unit (PDU) session to the DN (data network, e.g. an operator network or Internet) through the UPF over the reference point N6.

As further illustrated in FIG. 2, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 2 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 2 may be responsible for functions such as session management, mobility management, authentication, and security. These may be critical for delivering a service in the network. The AUSF, AMF, DN, NEF, NRF, NSSF, PCF, SMF, UDM, UPF, AF, UE, SCP, (R)AN may include the functionality for example as defined in clause 6.2 of 3GPP TS23.501 V16.1.0. For example, the SMF may include the following functionalities:

Session Management e.g. Session Establishment, modify and release, including tunnel maintain between UPF and AN node;

UE IP address allocation & management (including optional Authorization). The UE IP address may be received from a UPF or from an external data network;

DHCPv4 (server and client) and DHCPv6 (server and client) functions;

Configures traffic steering at UPF to route traffic to proper destination;

etc.

FIG. 3 shows a flowchart of a method according to an embodiment of the present disclosure, which may be performed by an apparatus implemented in/at or communicatively coupled to a network node. As such, the apparatus may provide means or modules for accomplishing various parts of the method 300 as well as means or modules for accomplishing other processes in conjunction with other components. The network node can be any suitable network node such as PGW or SMF as shown in FIGS. 1-2, which can send the address of at least one DNS to a UE.

At block 302, the network node determines whether one or more DNS servers in an edge computing of a network are available for a user equipment (UE) based on at least one of local configuration information, the UE's current location, the UE's capability or the UE's user subscription. The edge computing is close to the UE.

As used herein, a principle of the edge computing may be to extend cloud computing capabilities to the edge of the network. The edge computing may minimize network congestion and/or improve resource optimization, user experience and overall performance of the network. The edge computing may provide a platform that provides cloud-computing capabilities within edge devices of the network in close proximity to the UEs. For example, the edge computing can use edge devices such as server, User Plane Functions (UPF) or base stations for offloading computation tasks from mobile devices. The edge computing can support many applications and contents that need to be deployed towards the edge of the network in a distributed manner. With edge computing, the operators are able to host their own and/or 3rd party applications and/or contents close to the user. The UE can access the application and/or content in the edge computing via an access network, thus fulfilling the expectations on the end to end user experience, and allowing the low latency to the edge applications and the heavy traffic to be offloaded from backbone network to the edge. The edge device can be any suitable device such as User Plane Functions (UPF) or server or base stations deployed in the edge of the network. Some edge computing paradigms may comprise mobile edge computing (MEC), fog computing, etc. Current efforts in the 3GPP SA2 standardization group are placed on "Study on enhancement of support for Edge Computing in 5GC (FS_enh_EC)". In an embodiment, the edge computing as used herein may be similar to the Edge Computing as described in 3GPP SA2 standardization group or clause 5.13 of 3GPP TS23.501 V16.1.0.

The network device can be triggered to determine whether one or more DNS servers in the edge computing of the network are available for the UE based on at least one of local configuration information, the UE's current location, the UE's capability or the UE's user subscription in various ways. For example, this determination may be in response to the network device receiving a request (such as a DHCP request or a DNS server address request) from the UE or a command from another network device or various events (such as a change of the UE's current location and/or a change of the UE's capability and/or a change of the UE's user subscription and/or a new edge computing has been deployed in the network and/or an edge computing is failed or to be maintained or to be changed to a sleeping state, etc.).

In an embodiment, the network device may determine whether one or more DNS servers in the edge computing of the network are available for the UE based on the local configuration information. The location configuration information may be related to the edge computing of the network. For example, the location configuration information may indicate that the network node has an associated edge computing, and then the network device may determine whether one or more DNS servers in the associated edge computing are available for the UE. When the location configuration information indicates that the network node does not have an associated edge computing, the network device may determine one or more other DNS servers for the UE.

In an embodiment, the network device may determine whether one or more DNS servers in the edge computing of the network are available for the UE based on the UE's current location. For example, the network device may try to find an edge computing close to the UE by comparing the UE's current location and one or more candidate edge computing's location and determine whether one or more DNS servers in the edge computing of the network are available for the UE. When the network device does not find the edge computing close to the UE, the network device may determine one or more other DNS servers for the UE. The UE's current location can be obtained by the network device in various ways. For example, when the network node such as SMF or PGW receives a packet data network (PDN) Connectivity Request or a protocol data unit (PDU) session establishment request, the network node may obtain the UE's current location from the PDN Connectivity Request or the PDU session establishment request. In addition, the network node may obtain the UE's current location by using various location service procedures for example as defined in various 3GPP specifications. For example, when the network device is SMF, it can obtain the UE's current location by requesting location information for the UE from AMF or requesting or subscribing the current geodetic and optionally civic location of the UE from LMF (Location Management Function).

In an embodiment, the network device may determine whether one or more DNS servers in the edge computing of the network are available for the UE based on the UE's capability. For example, when the UE's capability indicates that the UE supports local DNS server (for example, DNS server in the edge computing of the network), then the network device may determine whether one or more DNS servers in the edge computing of the network are available for the UE. When the UE's capability does not explicitly indicates that the UE support the local DNS server, the network device may determine one or more DNS servers (local DNS or central DNS) for the UE. The UE's capability can be obtained by the network device in various ways. For example, when the network node such as SMF or PGW receives a packet data network (PDN) Connectivity Request or a protocol data unit (PDU) session establishment request, it may obtain the UE's capability from the PDN Connectivity Request or the PDU session establishment request.

In an embodiment, the network device may determine whether one or more DNS servers in the edge computing of the network are available for the UE based on the UE's user subscription. For example, when the UE's subscription indicates that the UE has subscribed to use local DNS server (for example, DNS server in the edge computing of the network), then the network device may determine whether one or more DNS servers in the edge computing of the network are available for the UE. When the UE's subscription indicates that the UE has not subscribed to use local DNS server, the network device may determine one or more other DNS servers for the UE. The UE's subscription can be obtained by the network device in various ways such as from UDM/HSS.

In various embodiments, the edge computing may be close to the UE. The term "close" may means that the edge computing may be close to the UE in terms of location, end to end latency, network topology, hop, etc.

In an embodiment, The network device may determine whether one or more DNS servers in the edge computing of the network are available for the UE based on at least one of local configuration information, the UE's current location, the UE's capability or the UE's user subscription in response to a configuration update initiated by the network. The configuration update may be UE configuration update. For example, the UE configuration may be updated by the network at any time using UE configuration update procedure. In an embodiment, in 5GS, the UE configuration update procedure may be similar to the UE Configuration Update procedure as described in clause 4.2.4 of 3GPP TS 23.502 V16.1.1, the disclosure of which is incorporated by reference herein in its entirety. In addition, a UE configuration update command sent from the network node such as AMF may contain respective address of the one or more DNS servers in the edge computing of the network.

At block 304, the network node sends, to the UE, a first message including respective address of the one or more DNS servers in the edge computing of the network in response to a positive determination. The first message may be any suitable message. For example, the message may be a configuration update command message when the UE configuration update is initiated by the network. The message may be a DNS server address response when the network node receives a DNS server address request from the UE. The message may be a DHCP offer message when the network node receives a DHCP discover message from the UE.

FIG. 4 shows a flowchart of a method according to another embodiment of the present disclosure, which may be performed by an apparatus implemented in/at or communicatively coupled to a network node. As such, the apparatus may provide means or modules for accomplishing various parts of the method 400 as well as means or modules for accomplishing other processes in conjunction with other components. The network node can be any suitable network node such as PGW or SMF as shown in FIGS. 1-2, which can send the address of at least one DNS to a UE. For some parts which have been described in the above embodiments, the description thereof is omitted here for brevity.

At block 402, the network node receives, from the UE, a DNS server address request. The DNS server address request may be sent in various ways. For example, the DNS server address request may be sent during a PDN connection establishment procedure or a PDU session establishment procedure. For example, in 5GS, UE may initiate a PDU session establishment procedure and send a PDU session establishment request to SMF. In the message, DNS Server IPV6 Address Request and/or DNS Server IPv4 address Request may be indicated in extended PCO. In an embodiment, the term "PCO" may be similar to the PCO as described in 3GPP specification such as 3GPP TS 23.502 V16.1.1.

In an embodiment, the DNS server address request may indicate that the UE requests the one or more DNS servers in the edge computing of the network. When the network node receives this DNS server address request, it may provide respective address of the one or more DNS servers in the edge computing close to the UE of the network.

In an embodiment, the DNS server address request may be an Internet protocol (IP) version 4 and/or version 6 DNS server address request. When the network node receives this DNS server address request, it may provide respective IPv4 address and/or IPv6 prefix of the one or more DNS servers in the edge computing of the network.

In an embodiment, the DNS server address request and the respective address of the one or more DNS servers may be included in extended protocol configuration options (PCO) during a packet data network (PDN) connection establishment procedure as described 3GPP TS 23.401 V16.3.0 or a protocol data unit (PDU) session establishment procedure as described in clause 4.3.2.2.1 of 3GPP TS 23.502 V16.1.1.

In an embodiment, the DNS server address request may be included in a dynamic host configuration protocol (DHCP) discovery message. The DHCP discovery message may be a DHCPv4 discovery message as described in RFC (Request For Comments) 2131 and/or DHCPv6 discovery message as described in RFC 3736. In another embodiment, the DHCP discovery message may further include the DNS server address request as described above. For example, to allocate the UE's IP address and send respective address of the one or more DNS servers in the edge computing of the network via DHCPv4, the UE may indicate to the network node within the PCO that the UE requests to obtain the IPV4 address and respective address of the one or more DNS servers in the edge computing of the network with DHCPv4.

Blocks 404 and 406 are similar to blocks 302 and 304 of FIG. 3.

In various embodiments, the first message may be a PDU session establishment accept message as described in clause 4.3.2.2.1 of 3GPP TS 23.502 V16.1.1 or an activate default EPS bearer context request as described in 3GPP TS 23.401 V16.3.0.

In various embodiments, the first message sent by the network node may include only the respective address of one or more DNS servers in the edge computing of the network. For example, when the UE has explicitly requested the respective address of one or more DNS servers in the edge computing of the network and/or when network node determines that two or more DNS servers in an edge computing of a network are available for the UE and/or the UE supports the DNS servers in the edge computing of the network and/or the UE has subscribed to use the DNS servers in the edge computing of the network, etc., then the network node may send only the respective address of one or more DNS servers in the edge computing of the network.

In various embodiments, the first message sent by the network node may include the respective address of one or more DNS servers in the edge computing of the network and respective address of one or more other DNS servers. For example, when the UE has not explicitly requested the respective address of one or more DNS servers in the edge computing of the network and/or when network node determines that only one DNS server in the edge computing of the network are available for the UE, etc., then the network node may send respective address of one or more DNS servers in the edge computing of the network and respective address of one or more other DNS servers. The one or more other DNS servers may be DNS servers in the center (such as cloud computing) of the network or other edge computing.

In various embodiments, the respective address of one or more DNS servers in the edge computing of the network included in the first message has an indication that the one or more DNS servers are in the edge computing of network. The indication can be implemented in various ways. For example, the address of each DNS server may have an indication such as a bit or bitmap.

At block 408, the network node sends, to the UE, a second message including respective address of one or more other DNS servers in response to a negative determination. The second message may be similar to the first message except that the included address of DNS server. For example, when the network node determines that no DNS server in the edge computing of the network is available for the UE, the network node may send, to the UE, a second message including respective address of one or more other DNS servers. The one or more other DNS servers may be DNS servers in the center (such as cloud computing) of the network or other edge computing.

In various embodiments, the DNS server addresses included in the first message are listed in order of preference such that the one or more DNS servers in the edge computing of the network are selected for DNS query by the UE at first. The network node and the UE may know the order of preference.

In various embodiments, a rule of DNS address selection may be delivered to the UE such that the one or more DNS servers in the edge computing of the network are selected for DNS query by the UE at first.

FIG. 5 shows a flowchart of a method according to another embodiment of the present disclosure, which may be performed by an apparatus implemented in/at or communicatively coupled to a network node. As such, the apparatus may provide means or modules for accomplishing various parts of the method 500 as well as means or modules for accomplishing other processes in conjunction with other components. The network node can be any suitable network node such as PGW or SMF as shown in FIGS. 1-2, which can send the address of at least one DNS to a UE. For some parts which have been described in the above embodiments, the description thereof is omitted here for brevity.

At block 502, the network node decides whether current DNS server information for the UE needs to be changed based on at least one of local configuration information, the UE's current location, the UE's capability or the UE's user subscription. For example, the network node may determine whether one or more DNS servers in an edge computing of the network are available for the UE based on at least one of local configuration information, the UE's current location, the UE's capability or the UE's user subscription as described above. Then the network node may compare current DNS server information for the UE and new determined DNS server information for the UE and decide the current DNS server information for the UE needs to be changed when there is a change between the current DNS server information and the new determined DNS server information. When there is no change between the current DNS server information and the new determined DNS server information, the network node may decide that the current DNS server information for the UE needs not to be changed.

At block 504, the network node sends a third message including updated DNS server information to the UE when the current DNS server information for the UE needs to be changed. The third message can be any suitable message which can be sent from the network node to the UE, such as NAS signaling exchange between the UE and the network device.

In an embodiment, the updated DNS server information may include respective address of one or more DNS servers in another edge computing close to the UE of the network. In another embodiment, the updated DNS server information may include only respective address of one or more DNS servers in another edge computing close to the UE of the network. In still another embodiment, the updated DNS server information may include respective address of one or more DNS servers in another edge computing close to the UE of the network and/or respective address of one or more other DNS servers.

In an embodiment, the updated DNS server information may be included in extended PCO during a PDU session modification procedure or a packet data network gateway (PGW) initiated bearer modification procedure. The PDU session modification procedure may be similar to the PDU Session Modification procedure as described in clause 4.3.3 of 3GPP TS 23.502 V16.1.1. The packet data network gateway (PGW) initiated bearer modification procedure may be similar to PDN GW initiated bearer modification procedure as described in clause 5.4.2 of 3GPP TS 23.401 V16.3.0. In an embodiment, the third message may be a PDU session modification command message as described in clause 4.3.3 of 3GPP TS 23.502 V16.1.1 or modify evolved packet system (EPS) bearer context request as described in clause 5.4.2 of 3GPP TS 23.401 V16.3.0.

In an embodiment, at least one application and/or content may be deployed towards the edge computing of the network in a distributed manner.

In an embodiment, the network node may be a packet data network (PDN) gateway or session management function (SMF).

FIG. 6 shows a flowchart of a method according to another embodiment of the present disclosure, which may be performed by an apparatus implemented in/at or communicatively coupled to a UE. As such, the apparatus may provide means or modules for accomplishing various parts of the method 600 as well as means or modules for accomplishing other processes in conjunction with other components. The network node can be any suitable network node such as UE as shown in FIGS. 1-2. For some parts which have been described in the above embodiments, the description thereof is omitted here for brevity.

At block 602, the UE receives, from a network node, a first message including respective address of the one or more domain name system (DNS) servers in an edge computing of a network. The one or more DNS servers in the edge computing of the network may be determined to be available for the UE based on at least one of local configuration information, the UE's current location, the UE's capability or the UE's user subscription. The edge computing is close to the UE. For example, the network node such as SMF or PGW may determine the one or more DNS servers in the edge computing of the network at block 302 of FIG. 3 and send the first message to UE at block 304 of FIG. 3, and then the UE may receive the first message.

In an embodiment, the UE may receive the first message in response to a configuration update initiated by the network as described above.

At block 604, the UE uses at least one DNS server address included in the first message for DNS query.

Figure 7:
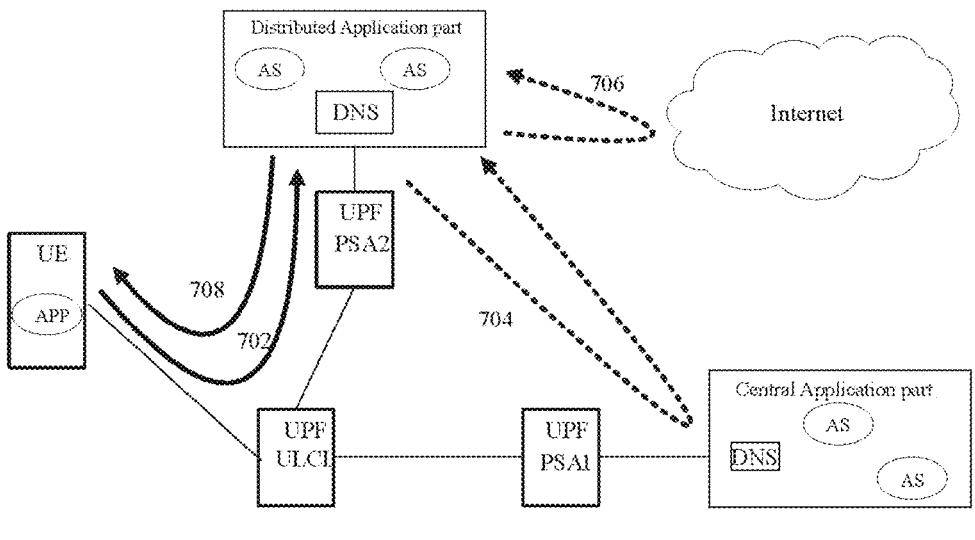
FIG. 7 schematically shows IP address resolving procedure with single DNS address configured in the UE.

FIG. 7 schematically shows IP address resolving procedure with single DNS address configured in the UE.

The SMF may send the address of local DNS server (LDNS) to the UE via a NAS message. The UE may update its local IP configuration. Optionally, if the UE already has a DNS address, the UE may replace current DNS address with the received address of the LDNS server. Then UE may send at least one or all DNS queries for the PDU session to the LDNS server. The LDNS server can resolve the address of local application server (AS) which is close to the UE. When the local application server is not available or the LDNS cannot resolve the IP address of the DNS query, the LDNS may forward the DNS query to a remote DNS (RDNS) in a central network or to a recursive DNS server in a public Internet.

At step 702, the UE has been configured with the DNS address of the LDNS. The UE sends a DNS query to LNDS.

At step 704 (optional), if the LDNS cannot resolve the IP address, or local AS not available, LDNS may forward the DNS query to the RDNS in the central network.

At step 706 (optional), if the LDNS cannot resolve the IP address, or local AS not available, LDNS may turn to a DNS server in the Internet.

At step 708, the LDNS sends the IP address of the AS in an answer to the UE.

Figure 8:
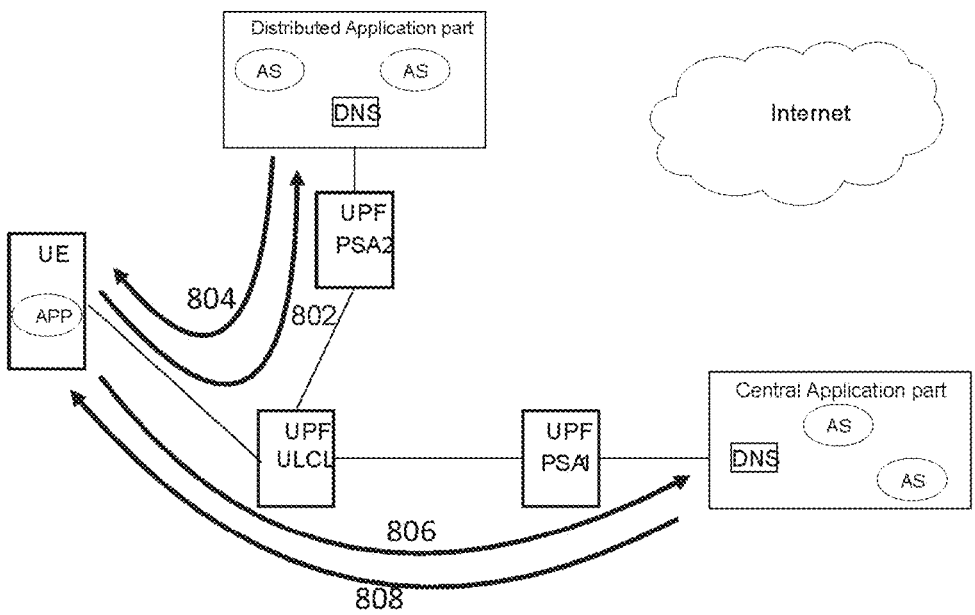
FIG. 8 schematically shows IP address resolving procedure with multiple DNS address configured in the UE.

FIG. 8 schematically shows IP address resolving procedure with multiple DNS address configured in the UE.

The SMF sends the UE the address of LDNS server and the RDNS server via NAS message. The UE updates its local IP configuration, and stores both above DNS addresses (LDNS and RDNS). The LDNS server may be selected for DNS query at first. When the LDNS cannot resolve the DNS query, the RDNS server can be selected as a secondary choice. Application Function (AF) or 5G system may also deliver a rule of DNS address selection to the UE for more efficient process of application server discovery.

At step 802, the UE has been configured with multiple DNS address (e.g. LDNS & RDNS). The UE sends a DNS query to LNDS at first.

At step 804, the LDNS delivers the DNS answer to the UE.

At step 806 (conditional), if the LDNS cannot resolve the IP address, or local AS not available. The UE may send a new DNS query to RDNS servers in the central network.

At step 808 (conditional), the RDNS delivers the DNS answer to the UE.

In various embodiment, the UE can be configured with different rules or priority for the selection of initial DNS server, e.g. based on application identifier (ID) or network policy.

FIG. 9 shows a flowchart of a method according to an embodiment of the present disclosure, which may be performed by an apparatus implemented in/at or communicatively coupled to a UE. As such, the apparatus may provide means or modules for accomplishing various parts of the method 900 as well as means or modules for accomplishing other processes in conjunction with other components. The network node can be any suitable network node such as UE as shown in FIGS. 1-2. For some parts which have been described in the above embodiments, the description thereof is omitted here for brevity.

At block 902, the UE sends, to the network mode, a DNS server address request. For example, the DNS server address request may be sent during a PDN connection establishment procedure or a PDU session establishment procedure. For example, in 5GS, UE may initiate a PDU session establishment procedure and send a PDU session establishment request to SMF. In the message, DNS Server IPv6 Address Request and/or DNS Server IPv4 address Request may be indicated in extended PCO.

Blocks 904 and 906 are similar to blocks 602 and 604 of FIG. 6 except that the UE receives the first message in response to sending the DNS server address request.

In an embodiment, the DNS server address request may indicate that the UE requests the one or more DNS servers in the edge computing of the network. When the network node receives this DNS server address request, it may provide respective address of the one or more DNS servers in the edge computing close to the UE of the network.

In an embodiment, the DNS server address request may be an Internet protocol (IP) version 4 and/or version 6 DNS server address request. When the network node receives this DNS server address request, it may provide respective IPv4 address and/or IPv6 prefix of the one or more DNS servers in the edge computing of the network.

In an embodiment, the DNS server address request and the respective address of the one or more DNS servers may be included in extended protocol configuration options (PCO) during a packet data network (PDN) connection establishment procedure or a protocol data unit (PDU) session establishment procedure.

In an embodiment, the DNS server address request may be included in a dynamic host configuration protocol (DHCP) discovery message.

In an embodiment, the first message may include only the respective address of one or more DNS servers in the edge computing of a network.

In an embodiment, the first message may include the respective address of one or more DNS servers in the edge computing of the network and respective address of one or more other DNS servers.

In an embodiment, the respective address of one or more DNS servers in the edge computing of the network included in the first message may have an indication that the one or more DNS servers are in the edge computing of network.

FIG. 10 shows a flowchart of a method according to another embodiment of the present disclosure, which may be performed by an apparatus implemented in/at or communicatively coupled to a UE. As such, the apparatus may provide means or modules for accomplishing various parts of the method 1000 as well as means or modules for accomplishing other processes in conjunction with other components. The network node can be any suitable network node such as UE as shown in FIGS. 1-2. For some parts which have been described in the above embodiments, the description thereof is omitted here for brevity.

At block 1002, the UE receives, from the network node, a second message including respective address of one or more other DNS servers. The one or more DNS servers in the edge computing of the network are determined to not available for the UE based on at least one of local configuration information, the UE's current location, the UE's capability or the UE's user subscription. For example, the network node may send the second message at block 408 of FIG. 4, and then the UE may receive the second message.

At block 1004, the UE uses the respective address of one or more other DNS servers for DNS query.

In an embodiment, the DNS server addresses included in the first message may be listed in order of preference such that the one or more DNS servers in the edge computing of the network are selected for DNS query by the UE at first.

In an embodiment, a rule of DNS address selection may be delivered to the UE such that the one or more DNS servers in the edge computing of the network are selected for DNS query by the UE at first.

In an embodiment, the first message may be a protocol data unit (PDU) session establishment accept message.

Figure 11:
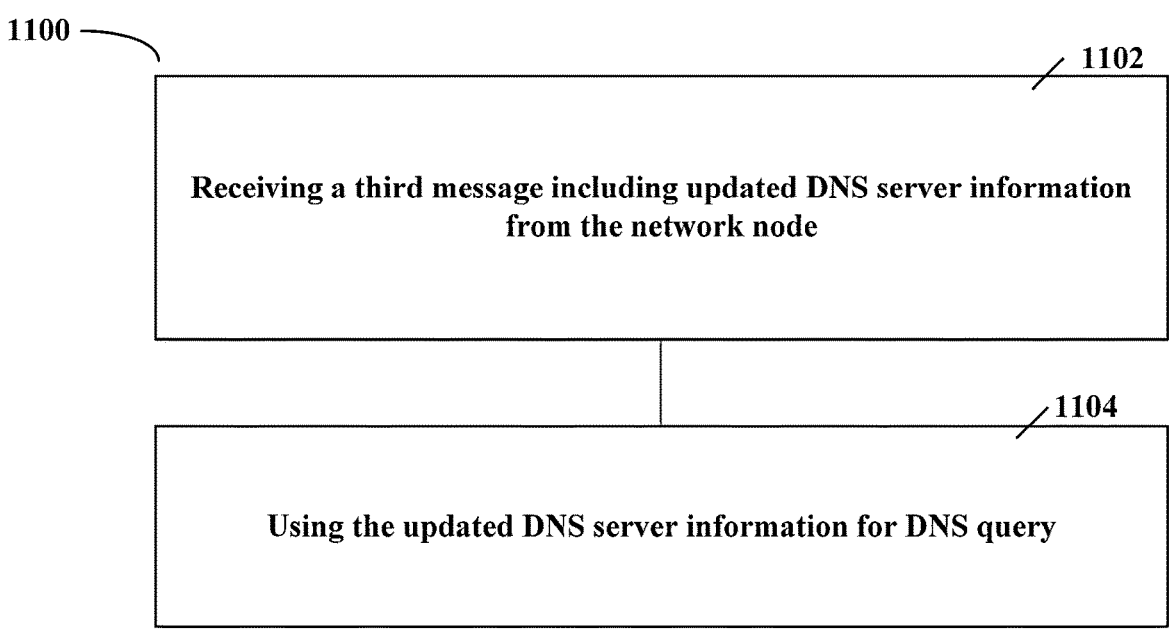
FIG. 11 shows a flowchart of a method according to another embodiment of the present disclosure.

FIG. 11 shows a flowchart of a method according to another embodiment of the present disclosure, which may be performed by an apparatus implemented in/at or communicatively coupled to a UE. As such, the apparatus may provide means or modules for accomplishing various parts of the method 1100 as well as means or modules for accomplishing other processes in conjunction with other components. The network node can be any suitable network node such as UE as shown in FIGS. 1-2. For some parts which have been described in the above embodiments, the description thereof is omitted here for brevity.

At block 1102, the UE receives a third message including updated DNS server information from the network node. For example, the network mode may send the third message at block 504 of FIG. 5, and then the UE may receive the third message.

At block 1104, the UE uses the updated DNS server information for DNS query.

In an embodiment, the updated DNS server information may include respective address of one or more DNS servers in another edge computing of the network, wherein said another edge computing is close to the UE.

In an embodiment, the updated DNS server information may be included in extended protocol configuration options (PCO) during a protocol data unit (PDU) session modification procedure or a packet data network gateway (PGW) initiated bearer modification procedure.

In an embodiment, the second message may be a protocol data unit (PDU) session modification command message or modify evolved packet system (EPS) bearer context request.

In an embodiment, at least one application and/or content may be deployed towards the edge computing of the network in a distributed manner.

In an embodiment, the network node may be a packet data network (PDN) gateway or session management function (SMF).

Figure 12:
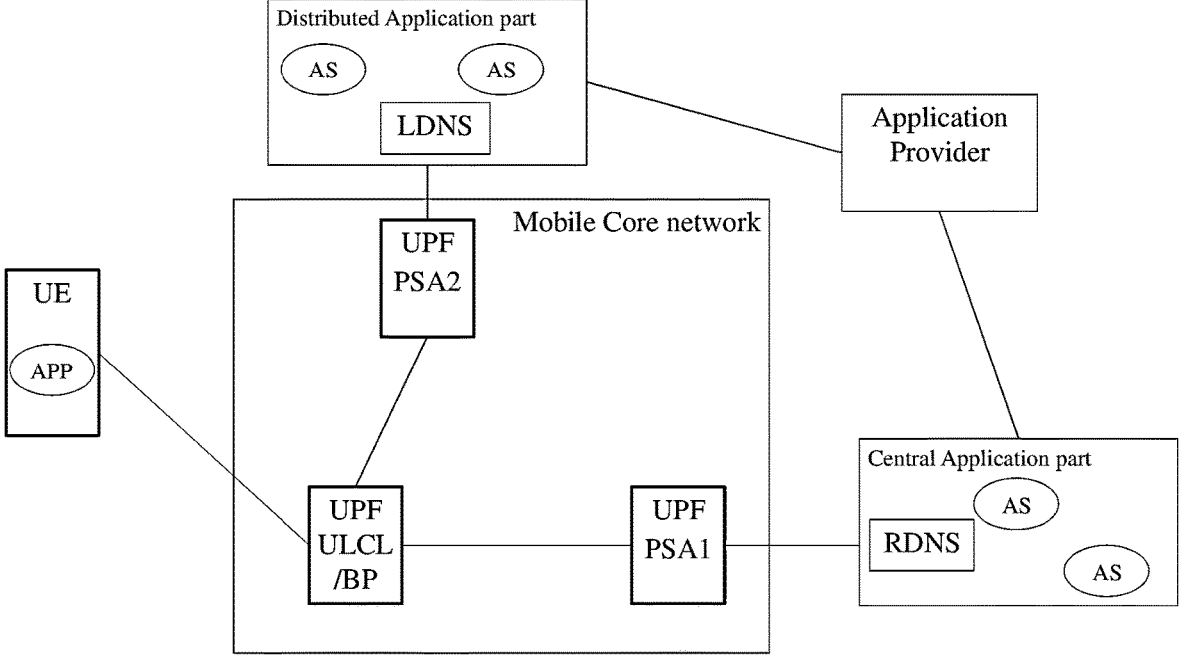
FIG. 12 shows an example of distributed application servers in 5G deployment.

FIG. 12 shows an example of distributed application servers in 5G deployment. As shown in FIG. 12, due to UE mobility or new traffic flow detection, the 5G Core Network can select a traffic to be routed to the applications in a local data network (DN). The SMF may decide to establish a new PDU Session Anchor (PSA) close to the UE and executes the traffic steering from the UPF to the local data network via a N6 interface. The insertion of a UPF with UL CL for IPV4 or "Branching Point (BP)" for IPV6 multi-homing in a data path of the PDU session is decided and controlled by the SMF. The embodiments of the disclosure can resolve the problem of IP address discovery of application servers (AS) in MEC for the UE. The SMF can update the IP configuration of UE, e.g. local DNS server (LDNS) in the MEC. When the new PSA UPF to the local DN was established for the PDU session. UE can discover the local AS via querying the LDNS server in MEC, and the selected traffic is forwarded on an N6 interface to the DN that is "close" to the AN (access network) serving the UE.

When the UE moves out of the serving area of the current local PSA UPF, the SMF may setup a new local PSA UPF and steer the traffic flows of the PDU session to the new application server. When the local PSA UPF is not available or required any more, the SMF may remove the additional PSA UPF for the PDU session. SMF may inform the UE to update the configuration of DNS address to a new LDNS or RDNS correspondingly.

The change of UE IP configuration (e.g. the change of IP address/prefix, DNS address) can be notified to the AF (via NEF), in case of the AF/NEF subscribes to the event exposure of the PDU session. Based on the notification from the SMF, the AF can trigger the migration of UE service context between different Application Servers to improve the user experience of service continuity.

Figure 13:
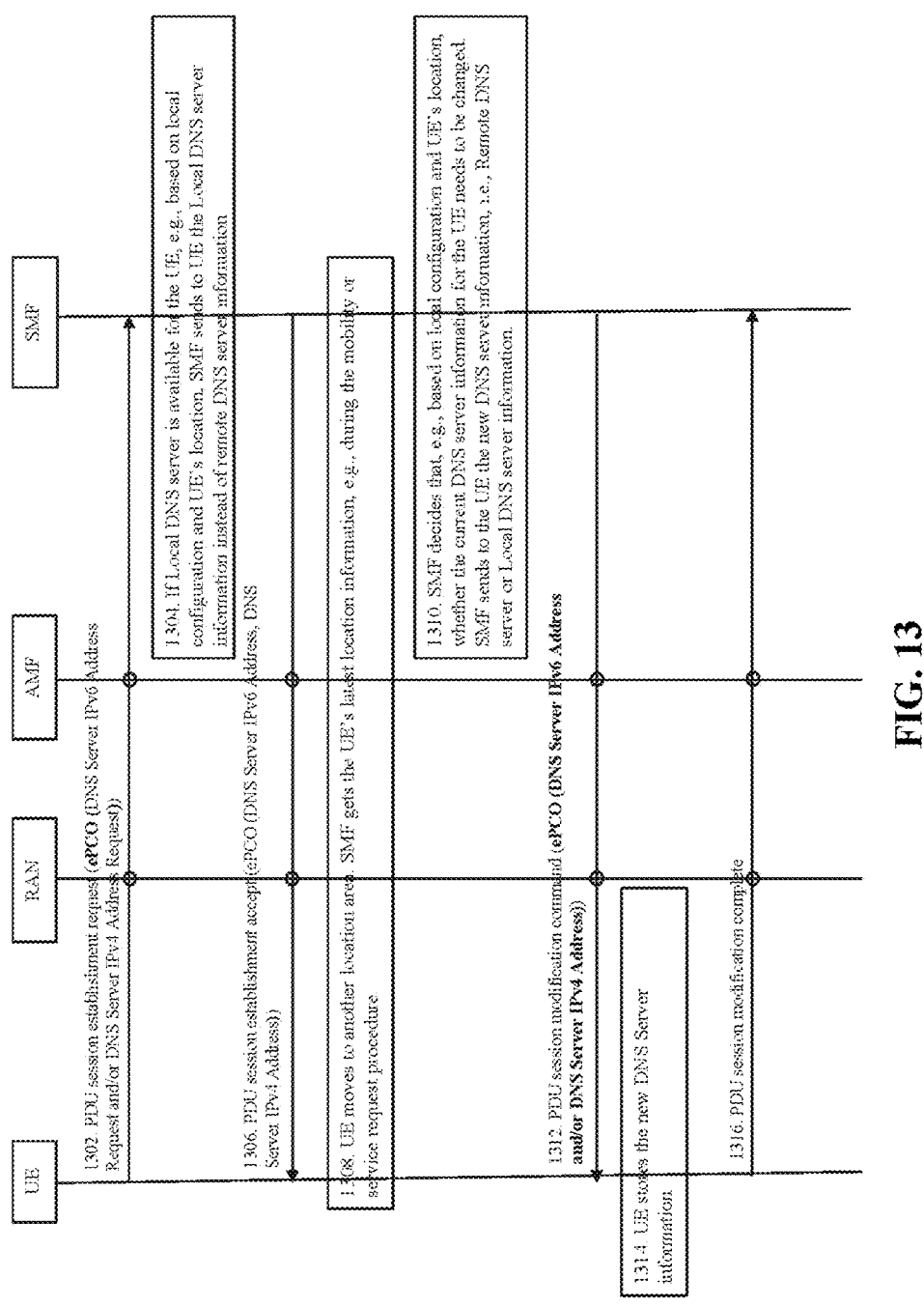
FIG. 13 shows a flowchart of a method according to another embodiment of the present disclosure.

FIG. 13 shows a flowchart of a method according to another embodiment of the present disclosure.

At step 1302, UE may initiate PDU session establishment procedure and sends PDU session establishment request to SMF. In the message, DNS Server IPv6 Address Request and/or DNS Server IPv4 address Request may be indicated in the extended PCO.

At step 1304, if local DNS server is available for the UE, e.g., based on local configuration and UE's location, SMF may send to UE the local DNS server information instead of remote DNS server information.

At step 1306, SMF may send PDU session establishment accept to UE. In the extended PCO of this message, DNS Server IPv6 Address and/or DNS Server IPv4 address may be included which indicate the local DNS server if available or the remote DNS server.

At step 1308, UE moves to another location area. SMF gets the UE's latest location information, e.g., during the mobility or service request procedure.

At step 1310, SMF decides that, e.g., based on local configuration and UE's location, whether the current DNS server information for the UE needs to be changed. SMF sends to the UE new DNS server information, i.e., remote DNS server or local DNS server information, when the current DNS server information for the UE needs to be changed.

At step 1312, if the UE's DNS server information needs to be changed, SMF sends PDU session modification command to UE. In the extended PCO of this message, DNS Server IPv6 Address and/or DNS Server IPv4 address may be included which may indicate the local DNS server if available or the remote DNS server.

At step 1314, the UE stores the new DNS server information.

At step 1316, the UE sends PDU session modification complete to SMF.

Figure 14:
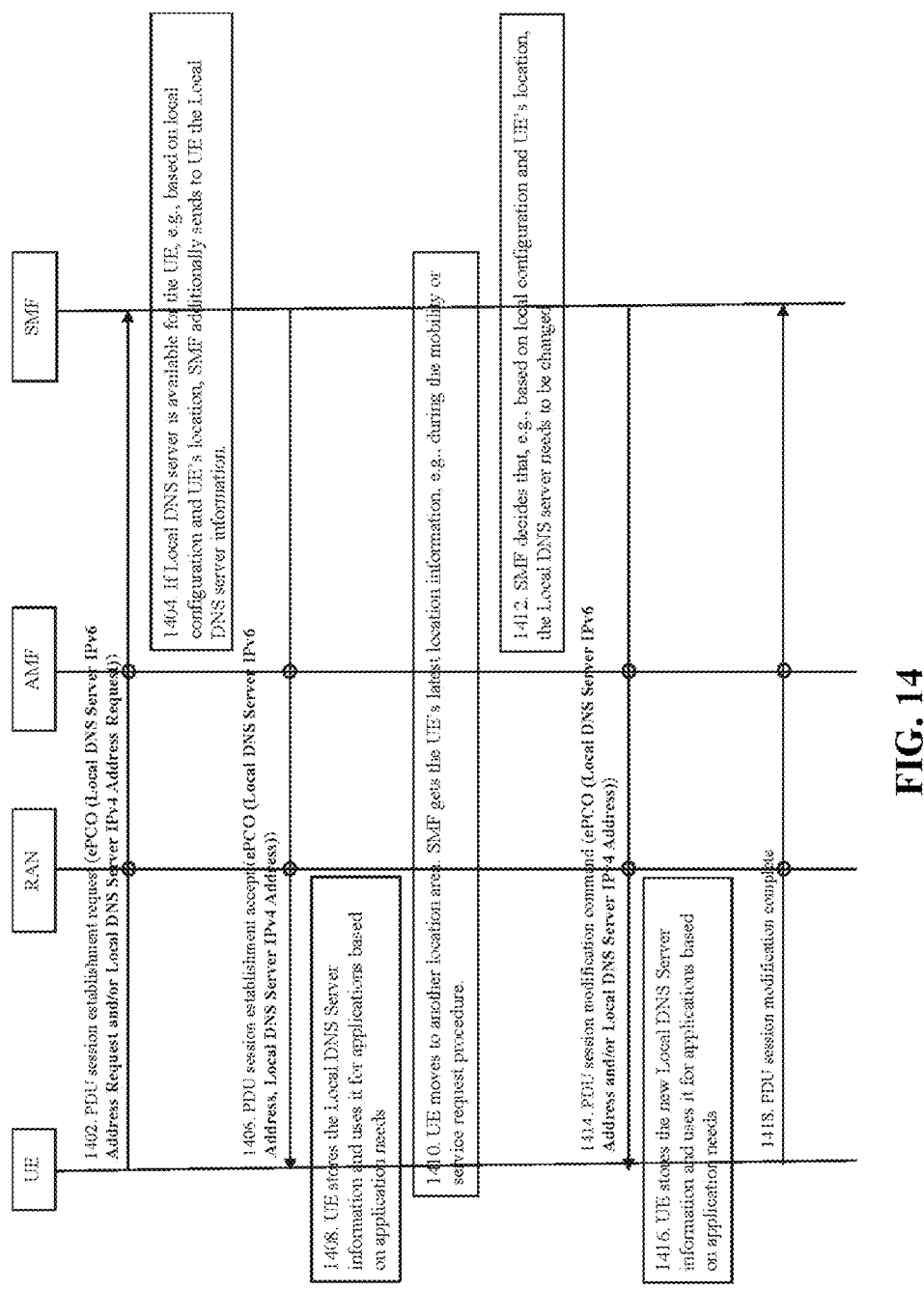
FIG. 14 shows a flowchart of a method according to another embodiment of the present disclosure.

FIG. 14 shows a flowchart of a method according to an embodiment of the present disclosure.

At step 1402, UE initiates PDU session establishment procedure and sends PDU session establishment request to SMF. In this message, if UE supports local DNS server in PCO function, UE indicates local DNS Server IPv6 address request and/or local DNS server IPv4 address request in the extended PCO.

At step 1404, if requested by UE and local DNS server is available for the UE, e.g., based on local configuration and UE's location, SMF additionally sends to UE the local DNS server information. SMF also stores the information that UE supports local DNS server in PCO function.

At step 1406, SMF sends PDU session establishment accept to UE. In this message, if requested by UE and the local DNS server is available, local DNS server IPv6 address and/or local DNS server IPv4 address are included in extended PCO.

At step 1408, UE stores the local DNS Server information and uses it for different applications based on application needs, i.e., some applications are associated to the remote DNS server (provided in DNS server IPv6 address and/or DNS server IPv4 Address in extended PCO) and some applications to the local DNS server.

At step 1410, UE moves to another location area. SMF gets the UE's latest location information, e.g., during the mobility or service request procedure.

At step 1412, SMF decides that, e.g., based on local configuration and UE's location, the local DNS server information needs to be changed.

At step 1414, If UE supports local DNS server in PCO and local DNS server information needs to be changed, SMF sends PDU session modification command to UE. In this message, local DNS server IPv6 address and/or local DNS server IPv4 address are included in extended PCO.

At step 1416, UE stores the new local DNS Server information and uses it for applications based on application needs.

At step 1418, UE sends PDU session modification complete to SMF.

Some messages as shown in FIGS. 13-14 are similar to the corresponding messages as described in 3GPP TS 23.502 V16.1.1 or other 3GPP specifications.

Many advantages may be achieved by applying the proposed solution according to embodiments of the present disclosure. For example, some embodiments of the disclosure may provide a method of successful discovery of application server address that is "close" to the UE via a method of dynamic configuration of DNS address in the UE. Some embodiments of the disclosure may can resolve the problem of MEC traffic routing in the 5G system. Some embodiments of the disclosure may maintain the consistence of standardized DNS discovery procedures and the integrity of user DNS messages. Some embodiments of the disclosure can avoid the security risk of DNS hijacking and IP packet modification. In some embodiments of the disclosure, more security extension (for example: HTTPS (Hypertext Transfer Protocol Secure), DNSSEC (Domain Name System Security Extensions) etc.) can be supported in the solution. Some embodiments of the disclosure can be based on standardized 5G signaling procedures (e.g. PDU Session establishment, PDU Session Modification etc.) with the enhancement of dynamic DNS address configuration in the UE. Some embodiments of the disclosure can be realized via simple modification to the information elements of related NAS messages. Some embodiments of the disclosure can minimize the impact to the 5G system, no modification requirement to the User Plane Function (UPF). Some embodiments of the disclosure can resolve the problem of IP address discovery of application servers in the MEC via a method of dynamic configuration of DNS address in the UE. In some embodiments of the disclosure, the SMF can update the IP configuration in the UE, e.g. address of Local DNS (LDNS), when the new PSA UPF connecting to the MEC was established. Some embodiments of the disclosure propose single DNS address in the UE. Some embodiments of the disclosure propose multiple DNS addresses in the UE. In some embodiments of the disclosure, the UE can easily discover the local AS via the LDNS server in the MEC, and selected traffic may be forwarded to the AS that is "close" to the UE.

Figure 15:
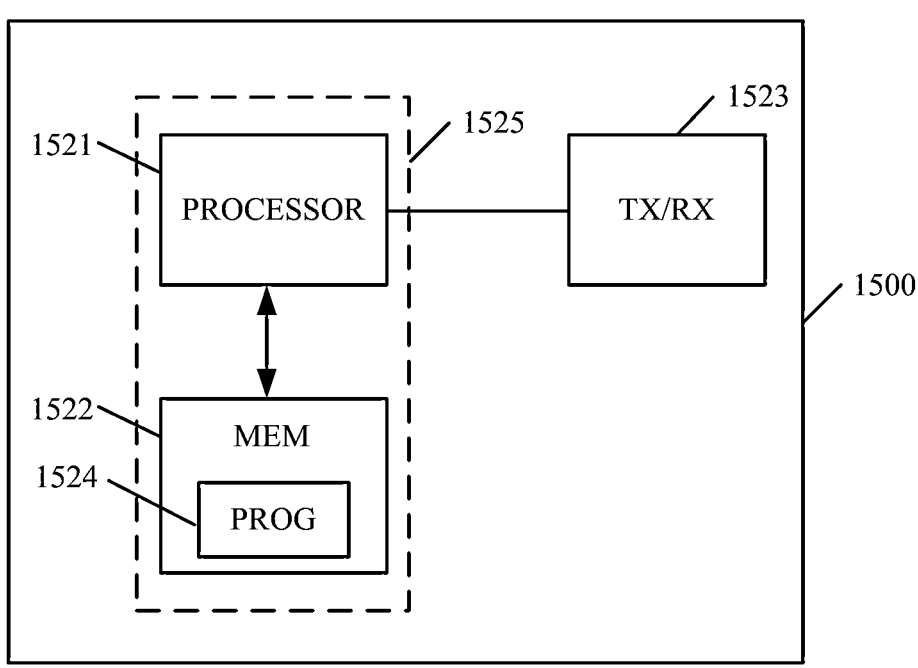
FIG. 15 is a block diagram showing an apparatus suitable for use in practicing some embodiments of the disclosure.

FIG. 15 is a block diagram showing an apparatus suitable for use in practicing some embodiments of the disclosure. For example, any one of the network node (such as SMF or PGW) or the UE as described above may be implemented through the apparatus 1500.

The apparatus 1500 comprises at least one processor 1521, such as a DP, and at least one MEM 1522 coupled to the processor 1521. The apparatus 1520 may further comprise a transmitter TX and receiver RX 1523 coupled to the processor 1521. The MEM 1522 stores a PROG 1524. The PROG 1524 may include instructions that, when executed on the associated processor 1521, enable the apparatus 1520 to operate in accordance with the embodiments of the present disclosure. A combination of the at least one processor 1521 and the at least one MEM 1522 may form processing means 1525 adapted to implement various embodiments of the present disclosure.

Various embodiments of the present disclosure may be implemented by computer program executable by one or more of the processor 1521, software, firmware, hardware or in a combination thereof.

The MEM 1522 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1521 may be of any type suitable to the local technical environment, and may include one or more of general purpose computers, special purpose computers, microprocessors, digital signal processors DSPs and processors based on multicore processor architecture, as non-limiting examples.

Figure 16:
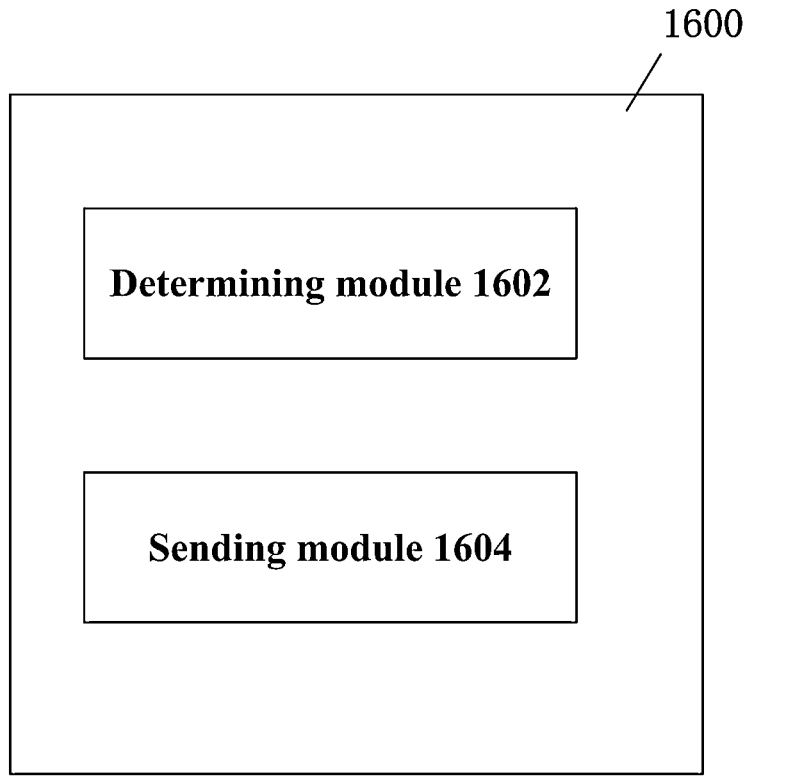
FIG. 16 is a block diagram showing a network node according to an embodiment of the disclosure.

FIG. 16 is a block diagram showing a network node according to an embodiment of the disclosure. As shown, the network node 1600 comprises a determining module 1602 and an sending module 1604. The determining module 1602 may be configured to determine whether one or more domain name system (DNS) servers in an edge computing of a network are available for a user equipment (UE) based on at least one of local configuration information, the UE's current location, the UE's capability or the UE's user subscription, wherein the edge computing is close to the UE. The sending module 1604 may be configured to send, to the UE, a first message including respective address of the one or more DNS servers in the edge computing of the network in response to a positive determination.

Figure 17:
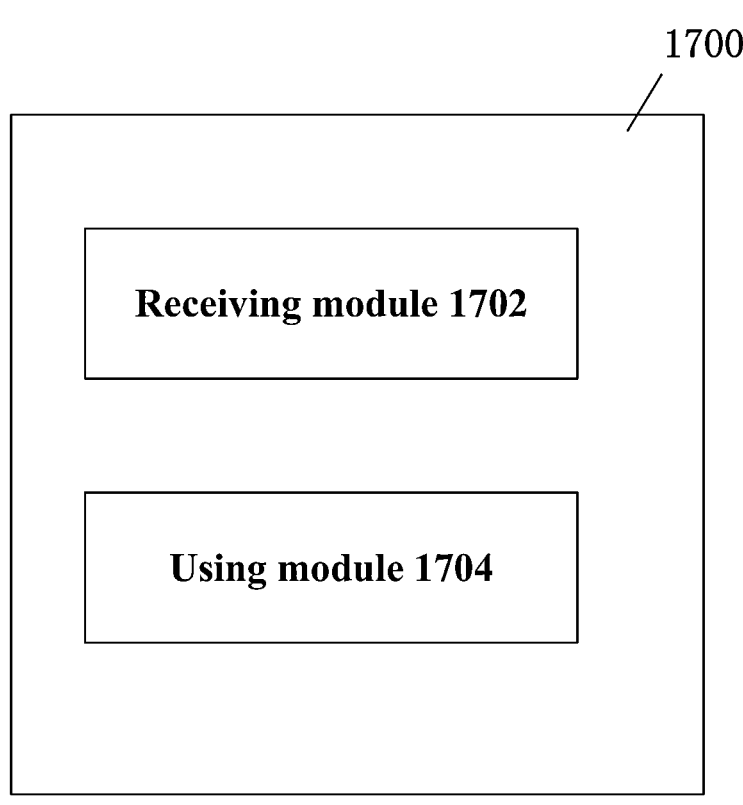
FIG. 17 is a block diagram showing a UE according to an embodiment of the disclosure.

FIG. 17 is a block diagram showing a UE according to an embodiment of the disclosure. As shown, the UE 1700 comprises a receiving module 1702 and a using module 1704. The receiving module 1702 may be configured to receive, from a network node, a first message including respective address of the one or more domain name system (DNS) servers in an edge computing of a network. The one or more DNS servers in the edge computing of the network are determined to be available for the UE based on at least one of local configuration information, the UE's current location, the UE's capability or the UE's user subscription, and the edge computing is close to the UE. The using module 1704 may be configured to use at least one DNS server address included in the first message for DNS query.

According to an aspect of the disclosure it is provided a computer program product being tangibly stored on a computer readable storage medium and including instructions which, when executed on at least one processor, cause the at least one processor to carry out any of the methods related to the network node as described above.

According to an aspect of the disclosure it is provided a computer program product being tangibly stored on a computer readable storage medium and including instructions which, when executed on at least one processor, cause the at least one processor to carry out any of the methods related to the UE as described above.

According to an aspect of the disclosure it is provided a computer-readable storage medium storing instructions which when executed by at least one processor, cause the at least one processor to carry out any of the methods related to the network node as described above.

According to an aspect of the disclosure it is provided a computer-readable storage medium storing instructions which when executed by at least one processor, cause the at least one processor to carry out any of the methods related to the UE as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a network node for communicating to a user equipment (UE) an address of a local domain name system (DNS) server deployed at edge computing, comprising:

determining based on a first criteria whether a local domain name system (DNS) server for edge computing is available at a current edge computing node to service a user equipment (UE);

with a positive determination of a DNS server being available at the current edge computing node to service the UE, sending, to the UE, a first message including an address of the local DNS server for edge computing to service the UE at the current edge computing node;

deciding based on a second criteria whether current local DNS server information for the UE needs to be changed; and upon the current local DNS server information for the UE needing to be changed, sending, to the UE, a second message of different type from the first message and including an updated local DNS server address to access a different local DNS server at another location from the current edge computing node, for the UE to use the updated local DNS server address for DNS query for discovery of a local application server for edge computing at the another location from the current edge computing node.

2. The method of claim 1, wherein the first message relates to a packet data unit (PDU) session for the UE, and the second message relates to modifying the PDU session.

3. The method of claim 2, wherein the first message is a PDU session establishment accept message, and wherein the second message is a PDU session modification command message.

4. The method according to claim 2, wherein the first message includes a respective address of one or more local DNS servers in the edge computing of a network and respective address of one or more other DNS servers.

5. The method according to claim 4, wherein the respective address of one or more local DNS servers in the edge computing of the network included in the first message has an indication that the one or more local DNS servers are in the edge computing of network.

6. The method according to claim 1, wherein the first criteria comprises at least one of local configuration information, UE's current location, UE's capability, and UE's user subscription.

7. The method according to claim 1, wherein the second criteria comprises at least one of local configuration information and UE's mobility.

8. The method according to claim 1, wherein the DNS server for edge computing at the current edge computing node provides IP addresses of application servers deployed at the current edge computing node.

9. The method according to claim 1, wherein the network node comprises a packet data network (PDN) gateway or a session management function (SMF).

10. A method at a user equipment (UE) for communication of an address of a local domain name system (DNS) server deployed at edge computing, comprising:

receiving, from a network node, a first message including an address of a local domain name system (DNS) server for edge computing that has been determined based on a first criteria to be available at a current edge computing node to service the UE;

using the address of the local DNS server included in the first message for DNS query for discovery of local application server for edge computing to service the UE at the current edge computing node;

receiving a second message of different type from the first message and including an updated local DNS server address from the network node to access a different local DNS server at another location from the current edge computing node, wherein the second message is received upon a decision that current local DNS server information for the UE needs to be changed based on a second criteria; and using the updated local DNS server address for DNS query for discovery of a local application server for edge computing at another location from the current edge computing node.

11. The method of claim 10, wherein the first message relates to a packet data unit (PDU) session for the UE, and the second message relates to modifying the PDU session.

12. The method of claim 11, wherein the first message is a PDU session establishment accept message, and wherein the second message is a PDU session modification command message.

13. The method according to claim 11, wherein the first message includes a respective address of one or more local DNS servers in the edge computing of a network and respective address of one or more other DNS servers.

14. The method according to claim 13, wherein the respective address of one or more local DNS servers in the edge computing of the network included in the first message has an indication that the one or more local DNS servers are in the edge computing of network.

15. The method according to claim 10, wherein the first criteria comprises at least one of local configuration information, UE's current location, UE's capability, and UE's user subscription.

16. The method according to claim 10, wherein the second criteria comprises at least one of local configuration information and UE's mobility.

17. The method according to claim 10, wherein the local DNS server for edge computing at the current edge computing node provides IP addresses of application servers deployed at the current edge computing node.

18. An apparatus at a network node for communicating an address of a local domain name system (DNS) server deployed at edge computing, comprising:

a processor; and a memory coupled to the processor, said memory containing instructions executable by said processor to cause the network node to:

determine based on a first criteria whether a local domain name system (DNS) server for edge computing is available at a current edge computing node to service a user equipment (UE);

with a positive determination of a DNS server being available at the current edge computing node to service the UE, send, to the UE, a first message including an address of the local DNS server for edge computing to service the UE at the current edge computing node;

decide based on a second criteria whether current local DNS server information for the UE needs to be changed; and upon the current local DNS server information for the UE needing to be changed, send, to the UE, a second message of different type from the first message and including an updated local DNS server address to access a different local DNS server at another location from the current edge computing node, for the UE to use the updated local DNS server address for DNS query for discovery of a local application server for edge computing at the another location from the current edge computing node.

19. The apparatus of claim 18, wherein the first message is a packet data unit (PDU) session establishment accept message, and wherein the second message is a PDU session modification command message.

20. The apparatus of claim 18, wherein:

the first criteria comprises at least one of local configuration information, UE's current location, UE's capability, and UE's user subscription; and the second criteria comprises at least one of local configuration information and UE's mobility.

21. The apparatus of claim 18, wherein the DNS server for edge computing at the current edge computing node provides IP addresses of application servers deployed at the current edge computing node.

22. An apparatus at a user equipment (UE) for communication of an address of a local domain name system (DNS) server deployed at edge computing, comprising:

a processor; and a memory coupled to the processor, said memory containing instructions executable by said processor to cause the UE to:

receive, from a network node, a first message including an address of a local domain name system (DNS) server for edge computing that has been determined based on a first criteria to be available at a current edge computing node to service the UE;

use the address of the local DNS server included in the first message for DNS query for discovery of local application server for edge computing to service the UE at the current edge computing node;

receive a second message of different type from the first message and including an updated local DNS server address from the network node to access a different local DNS server at another location from the current edge computing node, wherein the second message is received upon a decision that current local DNS server information for the UE needs to be changed based on a second criteria; and use the updated local DNS server address for DNS query for discovery of a local application server for edge computing at another location from the current edge computing node.

23. The apparatus of claim 22, wherein the first message is a packet data unit (PDU) session establishment accept message, and wherein the second message is a PDU session modification command message.

24. The apparatus of claim 22, wherein:

the first criteria comprises at least one of local configuration information, UE's current location, UE's capability, and UE's user subscription; and the second criteria comprises at least one of local configuration information and UE's mobility.

25. The apparatus of claim 22, wherein the local DNS server for edge computing at the current edge computing node provides IP addresses of application servers deployed at the current edge computing node.

* * * * *